US007392226B1

(12) United States Patent
Sasaki et al.

(10) Patent No.: US 7,392,226 B1
(45) Date of Patent: Jun. 24, 2008

(54) ELECTRONIC TICKET, ELECTRONIC WALLET, AND INFORMATION TERMINAL

(75) Inventors: Osamu Sasaki, Tokyo (JP); Tetsuo Matsuse, Osaka (JP); Hisashi Takayama, Tokyo (JP); Kyoko Kawaguchi, Chiba (JP); Yoshiaki Nakanishi, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 64 days.

(21) Appl. No.: 09/616,652

(22) Filed: Jul. 14, 2000

(30) Foreign Application Priority Data

Jul. 14, 1999 (JP) ............................. P. 11-200094
Jun. 20, 2000 (JP) ......................... P. 2000-185146

(51) Int. Cl.
*G06Q 99/00* (2006.01)
(52) U.S. Cl. ........................................... 705/64; 705/65
(58) Field of Classification Search ................... 705/5, 705/6, 7, 67, 65, 62, 64; 713/200, 201, 202, 713/176, 177
See application file for complete search history.

(56) References Cited

U.S. PATENT DOCUMENTS

| 5,621,797 | A | * | 4/1997 | Rosen ........................ 705/76 |
| 5,754,654 | A | * | 5/1998 | Hiroya et al. ................. 705/76 |
| 5,768,379 | A | * | 6/1998 | Girault et al. ............... 713/185 |
| 6,032,184 | A | * | 2/2000 | Cogger et al. ............... 709/223 |
| 6,032,260 | A | * | 2/2000 | Sasmazel et al. ............ 713/202 |

FOREIGN PATENT DOCUMENTS

| EP | 0 829 828 A1 | 3/1998 |
| EP | 0 923 040 A2 | 6/1999 |
| EP | 0 950 968 A1 | 10/1999 |
| FR | 2 760 159 | 8/1998 |
| JP | 409034824 A * | 2/1997 |
| JP | 11-184935 | 7/1999 |
| WO | WO 97/06639 | 2/1997 |
| WO | WO 98/57474 | 12/1998 |
| WO | WO 99/03242 | 1/1999 |
| WO | WO 99/09502 | 2/1999 |
| WO | WO 99/14678 | 3/1999 |

OTHER PUBLICATIONS

Fujimura et al. NTT Information and Communication Systems Labs, "General-Purpose Digital Ticket Framework", Proceedings of 3rd USENIX Workshop on Electronic Commerce, Aug.-Sep. 1998 Boston, MA, USA, pp. 177-186 (Cited on ESR).
André Meyer, "Pen Computing, A Technology Overview and a Vision",Jul. 1995, vol. 27, No. 3 SIGCHI Bulletin, pp. 46-90.
IBM Technical Disclosure Bulletin, "Portable Internet Settings", Dec. 1997, vol. 40, No. 12, 1 page.

\* cited by examiner

*Primary Examiner*—Pierre Eddy Elisca
(74) *Attorney, Agent, or Firm*—Pearne & Gordon LLP

(57) ABSTRACT

A network electronic ticket 1003 is provided in an electronic ticket 1000. Start page data 1016, a ticket owner secret key 1017, an electronic ticket possession certificate 1018, and a network service program 1019 are provided in the network electronic ticket 1003, the network service program 1019 controls various types of processing and an electronic ticket storage terminal, and the ticket owner secret key 1017 and the electronic ticket possession certificate 1018 are used for authentication processing with an information providing apparatus on a network, whereby it is made possible to connect to the network from the electronic ticket itself and receive information service.

16 Claims, 31 Drawing Sheets

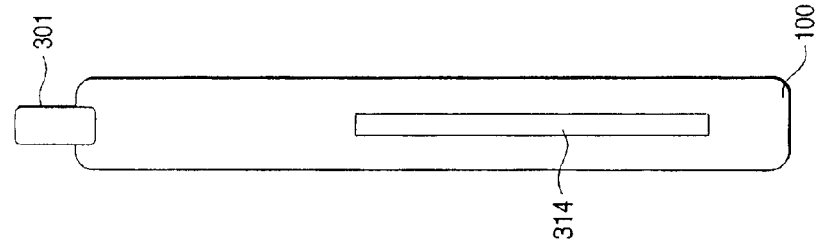
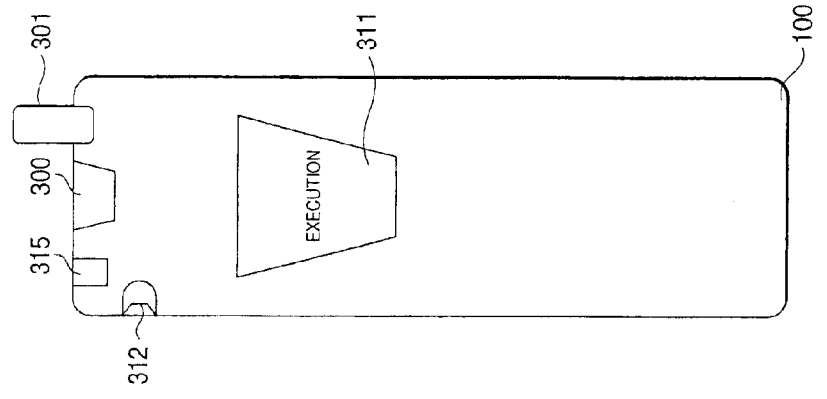
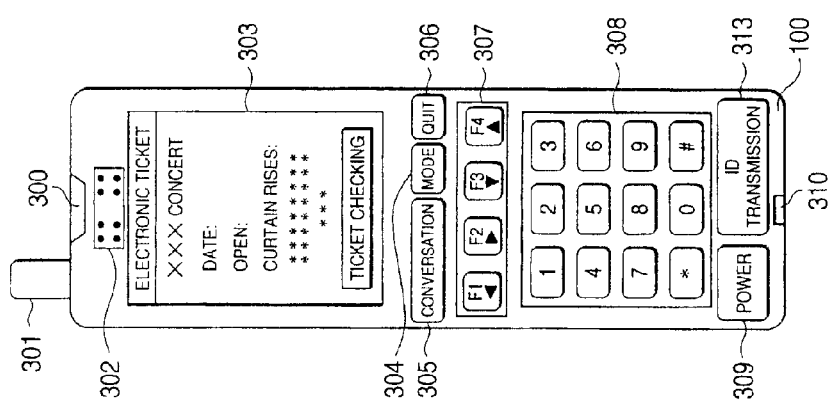

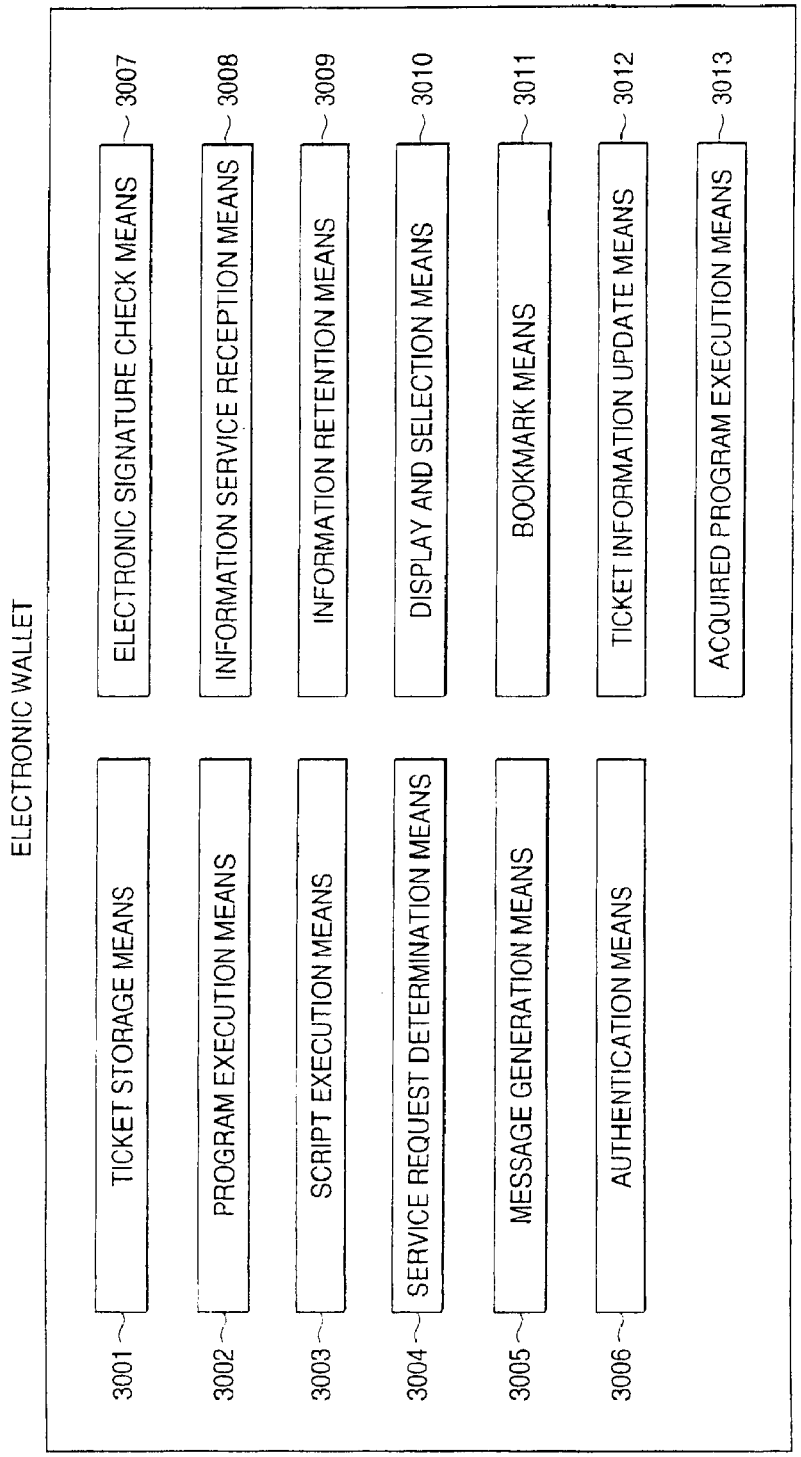

ELECTRONIC TICKET, ELECTRONIC WALLET, AND INFORMATION TERMINAL

BACKGROUND OF THE INVENTION

This invention relates to electronic tickets in electronic form into which various tickets of an event, a movie, a train, an airplane, etc., are converted, an electronic wallet for keeping the electronic ticket, an information terminal for storing the electronic wallet, an information providing apparatus for providing information for the information terminal, and an electronic ticket system comprising the components, and in particular to an electronic ticket provided with a function of receiving online information service.

Hitherto, the following has been known as a system for purchasing reserved seat tickets of various events, public performance, or conveyances:

FIG. 26 shows the configuration of a general system for purchasing reserved seat tickets (tickets) in a related art. A ticket issuing terminal 2602 for performing ticket issuing processing is installed in a ticket shop 2601 and is connected to a center system 2604 of a ticket issuer 2603 over a communication line 2605.

To purchase a reserved seat ticket of an event, a public performance, a conveyance, or the like, a personal consumer 2600 first goes to the ticket shop 2601, tells a salesperson that he or she wants to buy a ticket, and requests the salesperson to issue a ticket. At this time, the personal consumer 2600 can select the seat type (S grade seat, A grade seat, etc., on a concert); however, generally the ticket shop 2601 does not provide vacant seat information and thus often the personal consumer 2600 cannot select his or her desired seat.

Next, the salesperson of the ticket shop 2601 enters identification information of the desired ticket and the desired seat type in the ticket issuing terminal 2602 and performs the ticket issuing operation. The ticket issuing terminal 2602 transmits desired entry information (the identification information of the desired ticket and the desired seat type) to the center system 2604 of the ticket issuer 2603 over the communication line 2605. Upon reception of the information, the center system 2604 returns ticket information 2607 of the ticket of the desired type containing acquired seat information in the desired seat type to the ticket issuing terminal 2602. Generally, the center system 2604 often selects the seat acquired at the time from among vacant seats uniquely or at random.

The ticket issuing terminal 2602 prints the received ticket information 2607 on a specific pasteboard determined by the ticket issuer and outputs it as a ticket 2606 (2610). The salesperson of the ticket shop 2610 passes the issued ticket to the personal consumer 2600 in exchange for cash 2608 and terminates selling the ticket.

To enhance the added value of a ticket, for example, the ticket issuer 2603 attempts to construct a system wherein information concerning a ticket is open to the public on a home page on the WWW and URL information of the home page is described on the ticket for enabling the customer to receive the information providing service concerning the ticket.

In this case, however, any other person than the ticket purchaser would have access to the home page, and the effect of enhancing the added value of the ticket is not sufficiently produced.

Membership network service is known as information providing service aiming only at specific (ticket-purchasing) personal consumers with the described point remedied.

FIG. 27 shows the system configuration of general information providing service aiming at specific personal consumers. A service provider 2701, which is a provider for providing information service, is connected to an information server 2702 over a communication line 2705. The information server 2702 has a user management database 2703 and an information database 2704.

To receive membership information providing service, first the personal consumer 2700 requests the service provider 2701 to register a user ID and a password (2706). The service provider 2701 registers the user ID and the password in the user management database 2703 of the information server 2702 as the personal consumer 2700 requests (2707), and notifies the personal consumer 2700 that the user ID and the password have been registered (2708).

To receive information service, the personal consumer 2700 registering the user ID and the password accesses the information server 2702 and enters the user ID and the password (2709). The information server 2702 searches the user management database 2703 for the entered user ID and password. If the information server 2702 checks that the corresponding user ID and password exist, it searches the information database 2704 for information desired by the personal consumer 2700 and provides information service (2710).

However, the systems in the related arts involve the following problems:

(1) The personal consumer must go to the ticket shop to purchase a ticket or reserve a reserved seat and takes time and effort and cost;

(2) to receive information providing service aiming at specific (ticket-purchasing) personal consumers, the personal consumer needs to previously register authentication information of membership ID, password, etc., in the service provider. To receive service, the personal consumer needs also to enter the membership ID and the password each time; the operation is cumbersome.

(3) the service provider needs to provide a database, etc., for managing information of the registered membership IDs, passwords, etc., and thus must bear the high administration cost; and (4) if another person knows the registered membership ID and password of one person, it is made possible for even a person purchasing no ticket to receive provided service.

SUMMARY OF THE INVENTION

It is therefore an object of the invention to provide a system for putting various distributed tickets into electronic form and enabling the user to receive online information service based on the ticket to enhance the added value of the thicket and in particular to an electronic ticket for enabling a personal consumer to enjoy convenience without the inconvenience of operation of purchasing a ticket and get service under the system and making it possible to maintain high safety of the system and carry out administration at low costs, an electronic wallet for storing the electronic ticket, an information terminal for storing the electronic wallet, an information providing apparatus for supplying information to the information terminal, and the like.

To the end, according to the invention, an electronic ticket for receiving necessary permission or service from a provider and a network electronic ticket for accessing an information providing apparatus via a network are provided in a ticket, thereby making up a network-linked electronic ticket linked with the network.

An electronic wallet comprises ticket storage means for storing the network-linked electronic ticket and information service reception means for receiving online information service from the information providing apparatus using the network electronic ticket of the network-linked electronic ticket.

Thus, it is made possible for the personal consumer to directly access the information server for providing relevant information from the network-linked electronic ticket and receive online information service; the convenience of the personal consumer is improved.

It is made possible for the personal consumer to receive online information service by purchasing an electronic ticket, storing it in an electronic wallet, and possessing the electronic wallet; the convenience of the personal consumer is improved.

BRIEF DESCRIPTION OF THE DRAWINGS

In the accompanying drawings:

FIGS. 3A to 3C are a front view, a rear view, and a side view of a mobile user terminal in the embodiment of the invention;

FIG. 31 is a block diagram to show the configuration of an electronic wallet in the fourth embodiment of the invention.

DETAILED DESCRIPTION OF THE PREFERRED EMBODIMENTS

Referring now to the accompanying drawings, there are shown preferred embodiments of the invention. The invention is not limited to the specific embodiments and various modifications may be made without departing from the spirit of the invention.

First Embodiment

In a network-linked electronic ticket system of an embodiment of the invention, personal consumers purchase various tickets of events, movies, trains, airplanes, etc., as electronic information via a network and use the tickets for the gate terminals installed in the ticket gates of event places, movie theaters, stations, airports, etc. Only the ticket owners can receive provided information service related to the ticket via the network based on the tickets converted into the electronic information.

Figure 28A:
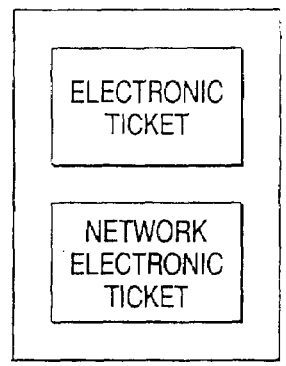
FIGS. 28A and 28B are drawings to schematically show an electronic ticket and its use mode respectively in the embodiment of the invention.
Figure 28B:
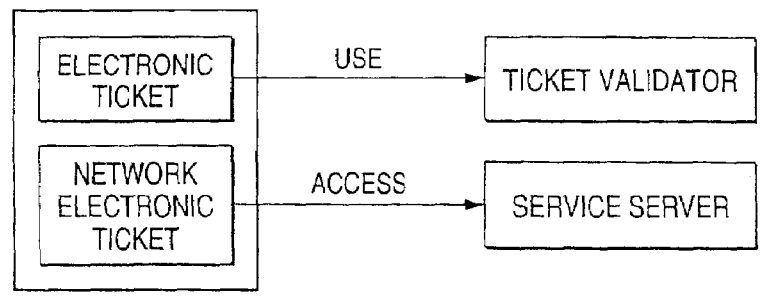

Hereinafter, various tickets converted into the electronic information will be collectively called "electronic tickets." The electronic ticket is electronic information having a negotiable securities character like a paper ticket and has a ticket function of receiving permission of entrance and provided commodity and service like a conventional ticket. The function of receiving online information service based on the electronic ticket is called "network electronic ticket." The substance of the network electronic ticket is an account for receiving online information service and/or program information for performing data processing to receive information service. The electronic ticket in the system of the embodiment, called "network-linked electronic ticket," has "electronic ticket" and "network electronic ticket," as shown in FIG. 28A. (The detailed data structure of the network-linked electronic ticket will be described later with reference to FIG. 10.) With the network-linked electronic ticket, the electronic ticket is used with a ticket validator and the network electronic ticket is used to access a service server for receiving online information service, as shown in FIG. 28B.

The system using the network-linked electronic ticket is called "network-linked electronic ticket system" and various services provided from the system by using the electronic ticket and the network electronic ticket are collectively called "network-linked electronic ticket service" and in particular, information service provided using the network electronic ticket is called "network information service."

Figure 1:
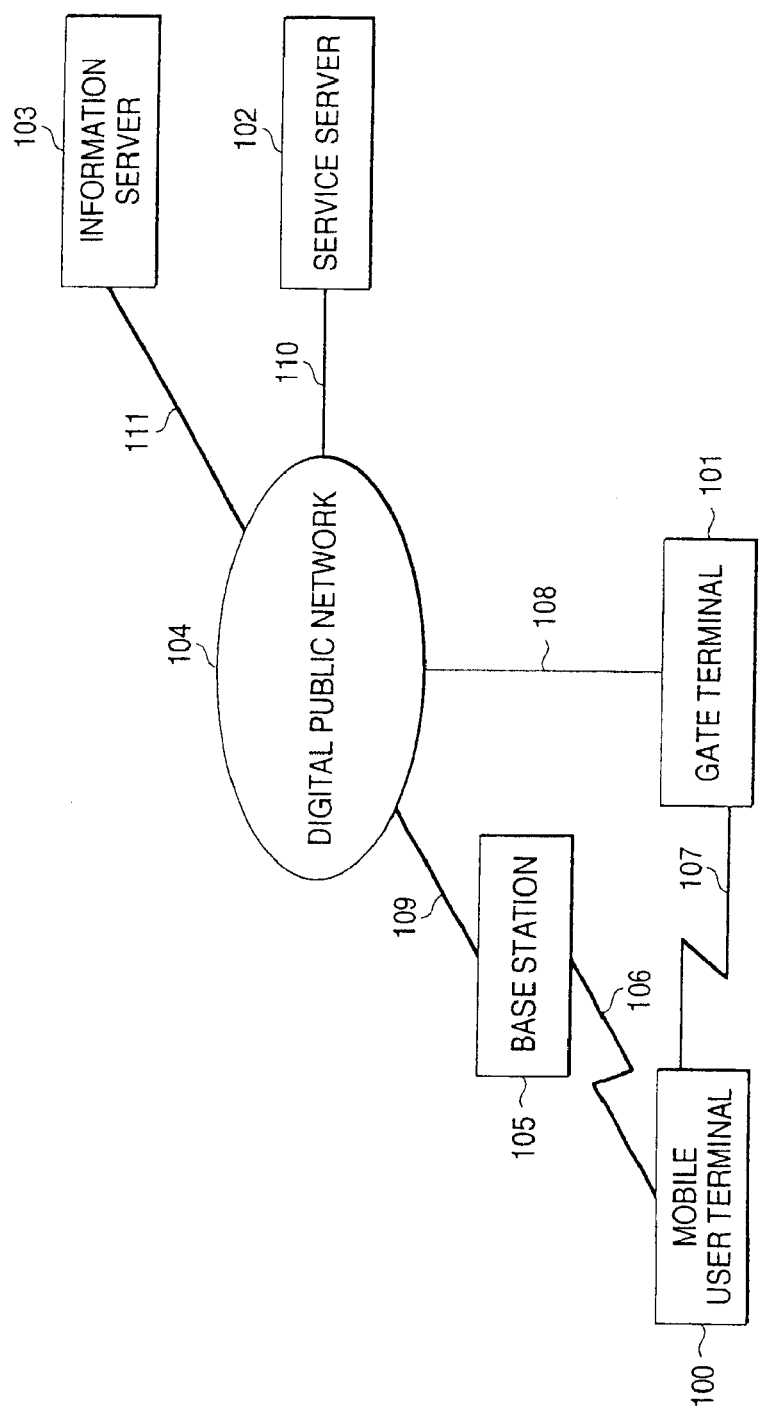
FIG. 1 is a system block diagram in one embodiment of the invention.

The network-linked electronic ticket system comprises a mobile user terminal 100 having a function of purchasing and using an electronic ticket, a gate terminal 101 for performing automatic ticket checking of an electronic ticket, a service server 102 for issuing a ticket, an information server 103 for providing information for the mobile user terminal 100, a digital public network 104 for providing data transmission paths on the network, and a radio telephone base station 105 for connecting the mobile user terminal 100 to the digital public network 104, as shown in FIG. 1, which is a system block diagram.

The mobile user terminal 100 has a two-way wireless communication function of two channels of infrared communications and digital radio telephone communications for conducting infrared communications with the gate terminal 101 and digital radio telephone communications through the base station 105. The mobile user terminal 100 also has an electronic ticket purchasing function, an electronic ticket use function, a function of reading information provided from the information server 103, and a function of receiving data from a GPS satellite and acquiring a position.

The gate terminal 101 for performing automatic ticket checking of an electronic ticket has a two-way communication function of two channels of infrared communications and digital telephone communications for conducting infrared communications with the mobile user terminal 100 and digital radio telephone communications through the digital public network 104.

The service server 102 has an electronic ticket issuing function, a digital communication function, and a ticket issuing database.

The information server 103 has a digital communication function, an information database, and an information retrieval (search) function.

In FIG. 1, numeral 106 denotes a transmission path of digital radio telephone communications between the mobile user terminal 100 and the base station 105, numeral 107 denotes a transmission path of infrared communications between the mobile user terminal 100 and the gate terminal 101, numeral 108 denotes a digital telephone communication line for connecting the gate terminal 101 and the digital public network 104, numeral 109 denotes a digital communication line for connecting the base station 105 and the digital public network 104, numeral 110 denotes a digital communication line for connecting the service server 102 and the digital public network 104, and numeral 111 denotes a digital communication line for connecting the information server 103 and the digital public network 104.

The following mode is assumed as the normal operation mode of the network-linked electronic ticket service:

The service server 102 is installed in an event company or a ticket issuing company. The information server 103 is installed in the event company, the ticket issuing company, or an independent organization entrusted by the event company or the ticket issuing company. More than one information server 103 may be provided in a one-to-one correspondence with the information types. The gate terminal 101 is installed at the entrance of an event place. The mobile user terminal 100 is carried by the personal consumer.

The network-linked electronic ticket service provided by the system enables the person purchasing an electronic ticket via the network to use the electronic ticket with the gate terminal 101 at the event place, etc., and only the owner of the electronic ticket to receive the provided information service related to the purchased electronic ticket via the network.

Specifically, the user uses the mobile user terminal 100 to purchase a network-linked electronic ticket from the service server 102 and stores the purchased network-linked electronic ticket in the mobile user terminal 100 for management. To use the electronic mail of the network-linked electronic ticket, the user uses the mobile user terminal 100 to conduct data communications with the gate terminal 101 for performing ticket checking processing of the electronic ticket stored in the mobile user terminal 100. To receive network information service with the network electronic mail of the network-linked electronic ticket, the user uses the mobile user terminal 100 to conduct data communications with the information server 103 for receiving authentication of the electronic ticket stored in the mobile user terminal 100, then receives the desired provided information service.

Figure 29A:
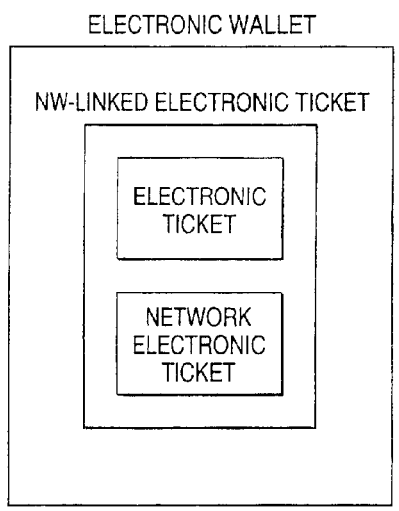
FIGS. 29A and 29B are drawings to schematically show an electronic wallet and an information terminal respectively in the embodiment of the invention.
Figure 29B:
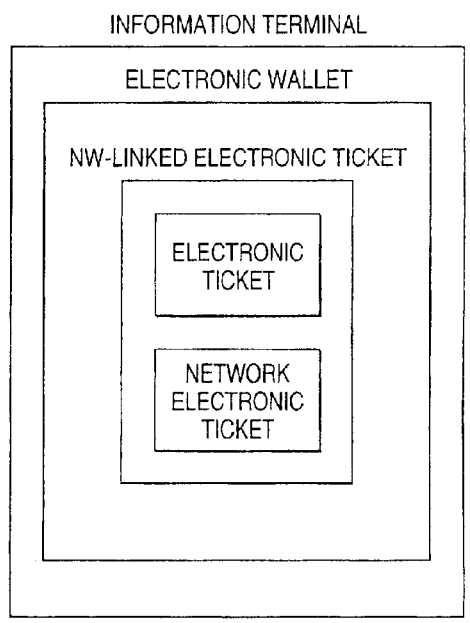

The means for holding and managing the network-linked electronic ticket in the mobile user terminal 100 is called "electronic wallet" in imitation of the representation generally used in the electronic commerce field. The substance of the electronic wallet is application for holding and managing the network-linked electronic ticket and receiving the network information service based on the network electronic ticket. FIG. 29A schematically shows the electronic wallet for holding and managing the network-linked electronic ticket and FIG. 29B schematically shows the mobile user terminal (information terminal) 100 for storing the electronic wallet.

The data communications between the components of the system to execute the network-linked electronic ticket service are conducted using the following transmission path or communication line:

First, the mobile user terminal 100 conducts infrared communications with the gate terminal over the transmission path 107, conducts digital telephone communications with the service server 102 by digital radio telephone via the transmission path 106, the base station 105, the digital communication line 109, the digital public network 104, and the digital communication line 110, and conducts digital telephone communications with the information server 103 by digital radio telephone via the transmission path 106, the base station 105, the digital communication line 109, the digital public network 104, and the digital communication line 111.

The gate terminal 101 and the service server 102 conduct digital data communications with each other via the digital telephone communication line 108, the digital public network 104, and the digital communication line 110.

Next, the components making up the system will be discussed.

First, the gate terminal 101 will be discussed. An outline of the gate terminal 101 will be given with reference to FIG. 2.

Figure 2:
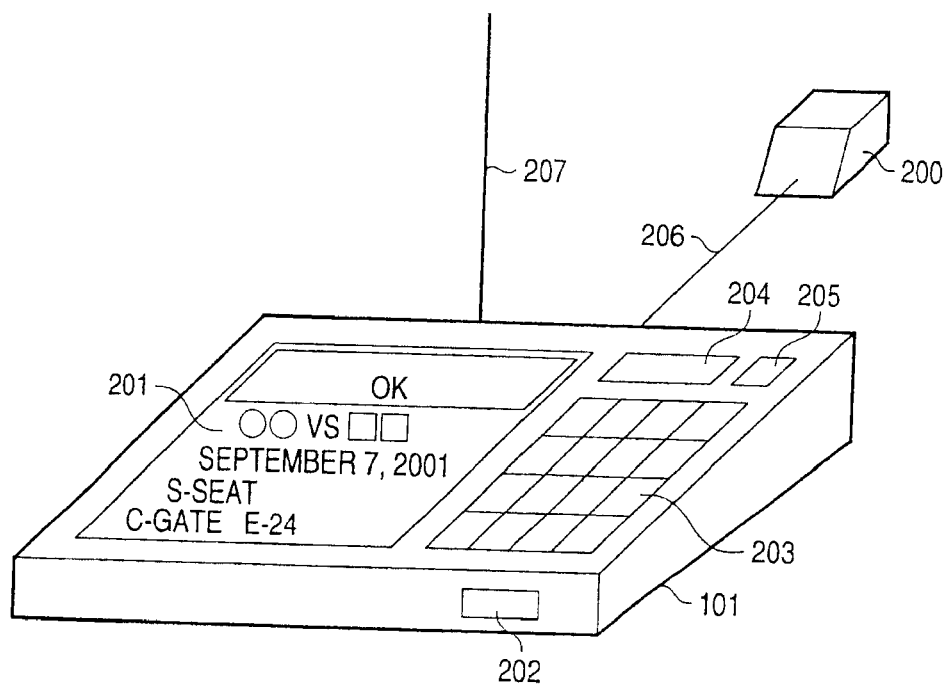
FIG. 2 is an external view of a gate terminal in the embodiment of the invention.

FIG. 2 is an external view of the gate terminal 101. In FIG. 2, numeral 200 denotes an infrared communication module for conducting infrared communications with the mobile user terminal 100, numeral 201 denotes a 640×480-pixel touch panel liquid crystal display (touch panel LCD), numeral 202 denotes a power switch, numeral 203 denotes a ten-digit keypad switch, numeral 204 denotes a menus switch for switching the touch panel LCD to a menu screen, numeral 205 denotes a lock switch for locking display produced on the touch panel LCD and operation of the gate terminal 101, and numeral 206 denotes a serial cable for connecting the infrared communication module 200 and the main body of the gate terminal 101. In addition, an RS-232C interface for connecting an external unit such as a gate opening/closing unit is placed on the rear side of the main body of the gate terminal 101. The infrared communication module 200 may be any other wireless communication module other than infrared communications, compatible with the communication function of the mobile user terminal 100.

The operation mode of the gate terminal 101 is roughly classified into a ticket checking mode for checking an electronic ticket for validity and a checked ticket setting mode for setting the valid electronic tickets to be checked. To change the operation mode of the gate terminal 101, the touch panel LCD 201 is set to a menu screen by pressing the menu switch 204 and any desired mode is selected by touching the screen.

In the ticket checking mode, the gate terminal 101 is placed in a state waiting for an electronic ticket to be shown by infrared communications. When the user uses the mobile user terminal 100 to show the electronic ticket stored in the electronic wallet, the shown electronic ticket is checked for validity, ticket checking processing information is exchanged with the mobile user terminal 100, and the result is displayed on the screen. The operator of the gate terminal 101 (merchant) permits or inhibits entrance of the user based on the ticket checking processing result displayed on the screen. If a gate opening/closing unit is connected to the gate terminal 101 as an external unit, the gate is opened or closed based on the ticket checking processing result.

The lock switch 205 is a switch used when the operator (merchant) leaves the gate terminal 101, etc. The operation of the screen and the gate terminal 101 is locked, whereby the gate terminal 101 is protected against illegal operation. Once the gate terminal 101 is locked by pressing the lock switch 205, it cannot be unlocked until a preset password is entered.

In the checked ticket setting mode, code information specifying the valid electronic ticket to be set in the gate terminal is entered with the ten-digit keypad switches 203, whereby a program module for checking the specified valid electronic ticket (ticket checking module) is down loaded from the service server 102 and the valid electronic ticket to be checked is set.

Next, the mobile user terminal 100 will be discussed.

FIGS. 3A to 3C are a front view, a rear view, and a side view of the mobile user terminal 100 respectively.

In FIG. 3A, numeral 300 denotes an infrared communication port (infrared communication module) for conducting infrared communications with the gate terminal 101, numeral 301 denotes an antenna for transmitting and receiving a radio wave of digital radio telephone, numeral 302 denotes a receiver speaker, numeral 303 denotes a 120×160-pixel color liquid crystal display (LCD), numeral 304 denotes a mode switch for changing the operation mode of the mobile user terminal 100, numeral 305 denotes a conversation switch of digital radio telephone, numeral 306 denotes a quit switch of digital radio telephone, numeral 307 denotes function switches, numeral 380 denotes a ten-digit keypad, numeral 309 denotes a power switch, and numeral 310 denotes a microphone. Numeral 313 denotes a button for transmitting the ID information stored in the terminal by infrared communications, namely, an ID transmission button.

Further, in FIG. 3B, numeral 311 denotes an execution switch for prompting for execution of processing involving user confirmation such as confirmation of payment or the transaction contents, numeral 312 denotes a headset jack for connecting a headset, and numeral 315 is an antenna for receiving data from a GPS satellite.

As shown in FIG. 3C, the mobile user terminal 100 may comprise an IC card slot 314 into which an IC card is inserted.

The mobile user terminal 100 provides the five operation modes of digital radio telephone mode, browser mode, electronic wallet mode, personal information management mode, and ID transmission mode. The digital radio telephone mode, the browser mode, the personal information management mode, and the ID transmission mode are changed by operating the mode switch 304. The electronic wallet mode is a mode for starting the operation of the electronic wallet and is called from the browser mode. FIG. 3A shows a screen on which an electronic ticket is displayed on the LCD in the browser mode.

In the digital radio telephone mode, the mobile user terminal 100 operates as a digital radio telephone based on a contract with a common carrier providing digital radio telephone service. In the browser mode, the mobile user terminal 100 displays general Internet access information on the LCD, displays more than one electronic ticket stored in the electronic wallet in the mobile user terminal 100 on the LCD, and displays on the LCD when service related to the electronic ticket (namely, network information service based on the network electronic ticket) and calls the electronic wallet mode and operates as the operation mode for using the electronic ticket stored in the electronic wallet in the mobile user terminal 100 with the gate terminal 101. In the personal information management mode, the user's personal information stored in the mobile user terminal 100 is referenced and user-set information is set. The ID transmission mode is a mode for transmitting the ID information stored in the mobile user terminal 100.

To use the mobile user terminal 100, for example, to normally make a call, the user first operates the mode switch 304 to set the operation mode to the digital radio telephone mode, next enters a telephone number with the ten-digit keypad switches 308 and presses the conversation switch 305. Now, the user can make a call at the entered telephone number.

To receive a normal incoming call at the mobile user terminal 100, the mobile user terminal 100 produces an incoming call sound regardless of the operation mode. In this case, the user can press the conversation switch 305 for automatically changing to the digital radio telephone mode and can receive the call.

To use an electronic ticket to undergo ticket checking, first the user operates the mode switch 304 to set the operation mode to the browser mode, and further calls the electronic wallet mode and selects the used ticket (displays the used electronic ticket on the LCD 303) with the function switch 307 (F1 or F2). Next, the user points the infrared communication port 300 at the gate terminal 101 installed at the entrance of the movie theater or the event place and presses the execution switch 311. Now, the mobile user terminal 100 is changed to the electronic wallet mode, conducts infrared communications with the gate terminal 101, exchanges the ticket checking processing information, and performs ticket checking processing of the electronic ticket.

In the ID transmission mode, the ID transmission button 313 is validated. When the user presses the ID transmission button 313, the ID information stored in the terminal is transmitted by infrared communications. If the mobile user terminal 100 comprises the IC card slot 314 and an IC card is inserted therein, the ID information stored on the IC card is transmitted.

Next, the internal configuration of the mobile user terminal 100 will be discussed.

Figure 4:
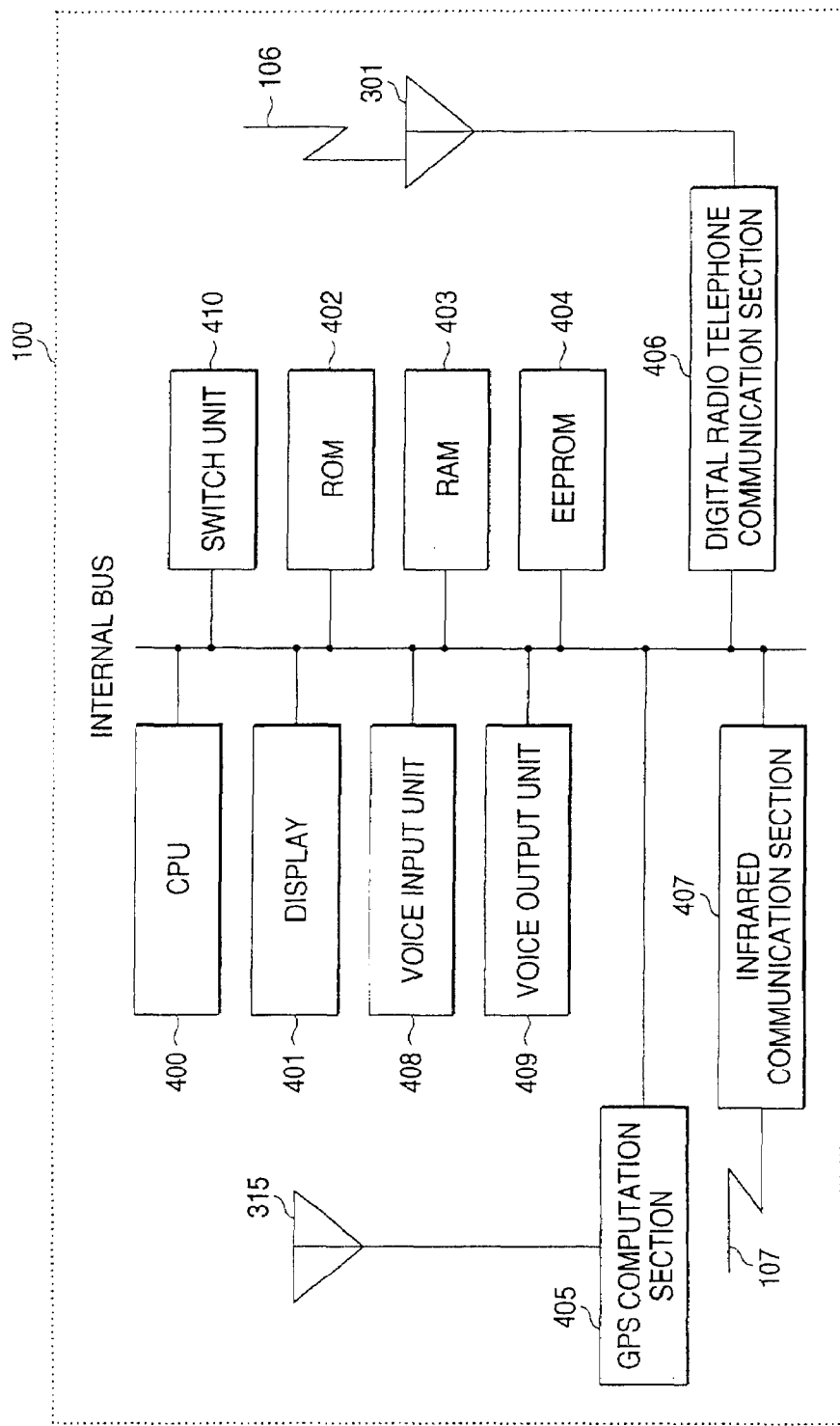
FIG. 4 is a block diagram of the internal configuration of the mobile user terminal in the embodiment of the invention.

FIG. 4 is a block diagram of the mobile user terminal 100.

The mobile user terminal 100 comprises a CPU (central processing unit) 400 for processing transmission data and reception data and controlling other components in accordance with a program stored in ROM (read-only memory) 402, RAM (random access memory) 403 for storing the data to be processed by the CPU 400 and the data processed by the CPU 400, EEPROM (electrically erasable programmable read-only memory) 404, a display (LCD) 401 for displaying various pieces of information in the mobile user terminal 100, an infrared communication section (infrared communication module) 407 for conducting infrared communications with the gate terminal 101, a digital radio telephone communication section 406 for conducting digital radio telephone communications with the base station 105, an antenna 301 for transmitting and receiving radio waves of digital radio telephones, a GPS computation section 405 provided by combining an antenna and a GPS receiver for receiving data from a GPS satellite and a GPS computer for analyzing the received data and finding position information such as coordinate information and time information, a voice input unit 408, a voice output unit 409, and a switch unit 410. The infrared communication module 407 may be any other wireless communication module other than infrared communications, compatible with the communication function of the gate terminal 101.

The mobile user terminal 100 may comprise an IC card reader and an IC card in place of the EEPROM (electrically erasable programmable read-only memory) 404.

An electronic wallet program for purchasing, storing, and using an electronic ticket and a browser program for reading relevant information to the purchased electronic ticket are stored in the ROM 402.

Figure 5:
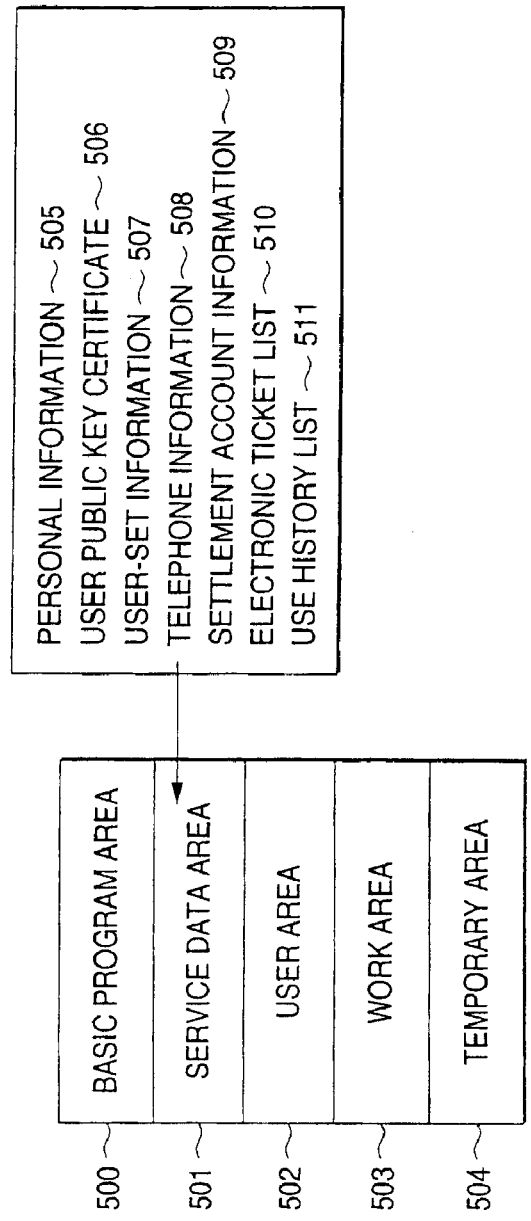
FIG. 5 is a data structure drawing in the mobile user terminal in the embodiment of the invention.

FIG. 5 is a schematic drawing of the data stored in the EEPROM 404.

The EEPROM 404 contains a basic program area 500, a service data area 501, a user area 502, a work area 503, and a temporary area 504.

The basic program area 500 stores updates of the programs stored in the ROM 402 of the mobile user terminal 100, a patch program, and an additional program.

The user area 502 is an area that can be used as desired by the user, the work area 503 is a work area used for the CPU 400 of the mobile user terminal 100 to execute a program, and the temporary area 504 is an area for temporarily storing information received by the mobile user terminal 100. The service data area 501 is an area for storing electronic ticket information, history information, etc.

The service data area 501 stores personal information 505, a user public key certificate 506, user-set information 507, telephone information 508, settlement account information 509, an electronic ticket list 510, and a use history list 511. The personal information 505 is information of the name, age, sex, etc., of the user, the user public key certificate 506 is the public key certificate of the user, the user-set information 507 is user-set information concerning network-linked electronic ticket service, the telephone information 508 is information related to digital radio telephone such as telephone number, the settlement account information 509 is information of the settlement account registered by the user, the electronic ticket list 510 is list information of the electronic tickets owned by the user and the substance of the data, and the use history list 511 is use history information of the network-linked electronic ticket system.

If the mobile user terminal 100 comprises the IC card slot 314, some or all of the above-described data is stored on an IC card.

Next, the service server 102 and the information server 103 will be discussed.

The service server 102 and the information server 103 are implemented as at least one or more computers. The service server 102 and the information server 103 are in institutes approved by the ticket issuer and may be the same terminal.

The service server 102 owns a ticket issuing database for issuing tickets and a service server secret key for digital signature. The information server 103 owns an information database, a service server certificate, and a service server public key.

Figure 10:
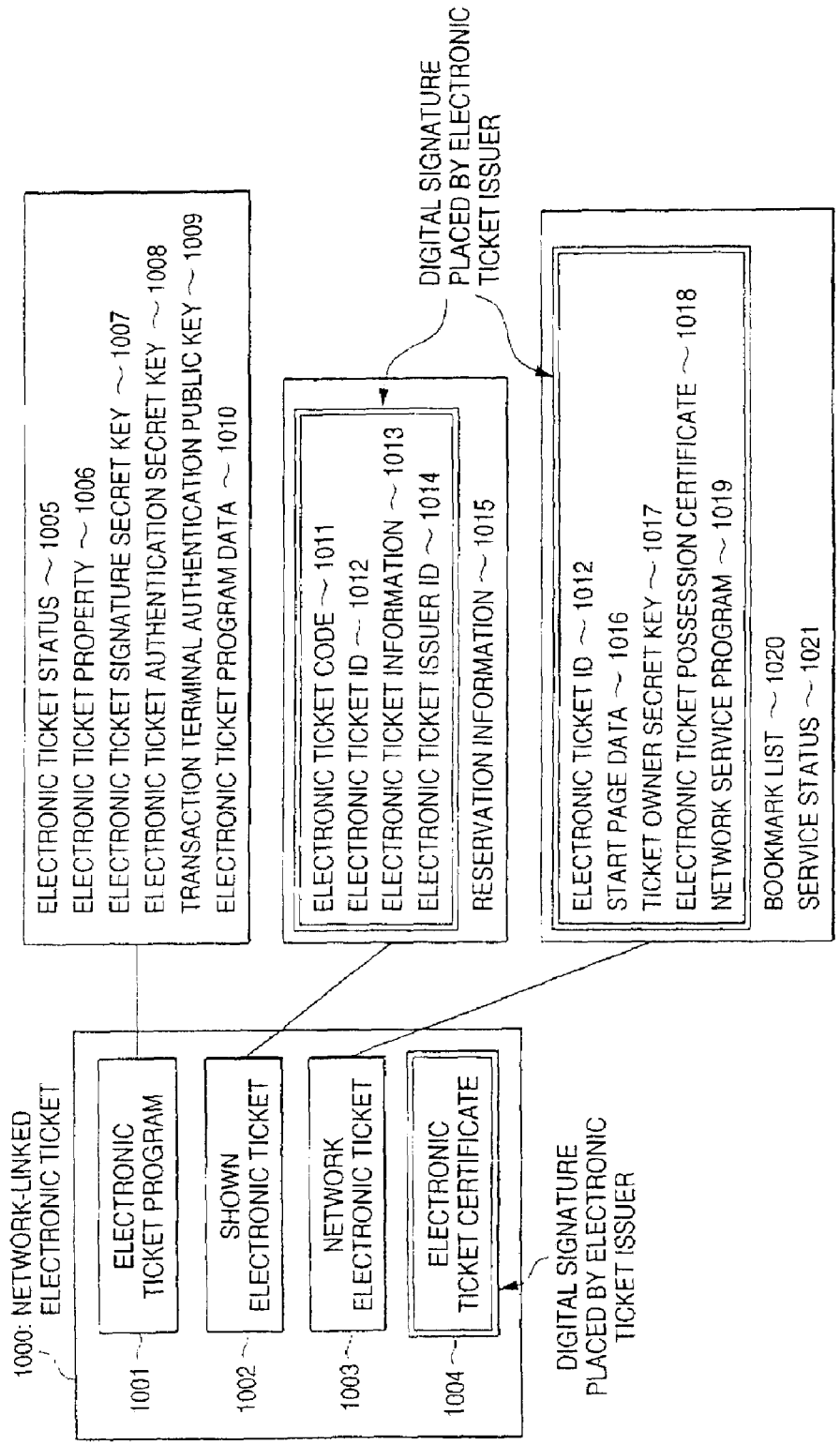
FIG. 10 is a data structure drawing of an electronic ticket in first, second, and fourth embodiments of the invention.

FIG. 10 is a schematic drawing to show the data structure of a network-linked electronic ticket. Here, the portions surrounded by double lines denote portions on which the electronic ticket issuer places a digital signature. In FIG. 10, one network-linked electronic ticket 1000 is made up of the four parts of an electronic ticket program 1001, a shown electronic ticket (electronic ticket in FIG. 28) 1002, a network electronic ticket (network electronic ticket in FIG. 28) 1003, and an electronic ticket certificate 1004. The electronic ticket program 1001 is information stimulating management of the electronic ticket status and the operation proper to the electronic ticket, the shown electronic ticket 1002 is information shown to the gate terminal 101 as information indicating the contents of the electronic ticket, the network electronic ticket 1003 is "information necessary for connecting to the network and receiving information service from the network-linked electronic ticket," and the electronic ticket certificate 1004 is the certificate of the electronic ticket issued by the electronic ticket issuer and is information indicating that the electronic ticket is valid.

One network-linked electronic ticket has six keys falling under four categories in public-key cryptosystem. One category involves digital signature keys of electronic ticket, namely, an electronic ticket signature secret key 1007 stored in the electronic ticket program 1001 and an electronic ticket signature public key stored in the electronic ticket certificate 1004 as a secret key and its corresponding public key respectively. Another category involves an electronic ticket authentication secret key 1008 stored in the electronic ticket program 1001, used for electronic ticket authentication processing with the gate terminal 101. Another category involves a transaction terminal authentication public key 1009 stored in the electronic ticket program 1001, used for authentication processing of the gate terminal 101 performed by the mobile user terminal 100. Another category involves a ticket owner secret key 1017 stored in the network electronic ticket 1003 and a ticket owner public key stored in an electronic ticket possession certificate 1018 used for authentication processing of the electronic ticket and the mobile user terminal 100 with the information server 103.

The electronic ticket signature secret key 1007, the electronic ticket signature public key, the ticket owner secret key 1017, and the ticket owner public key are key pairs unique to each electronic ticket, and the electronic ticket authentication secret key 1008 and the transaction terminal authentication public key 1009 are keys unique to each electronic ticket type. The electronic ticket authentication public key and the transaction terminal authentication secret key corresponding to the electronic ticket authentication secret key 1008 and the transaction terminal authentication public key 1009 are set in the gate terminal 101.

In FIG. 10, first the electronic ticket program 1001 is made up of an electronic ticket status 1005, an electronic ticket property 1006, an electronic ticket signature secret key 1007, an electronic ticket authentication secret key 1008, a transaction terminal authentication public key 1009, and electronic ticket program data 1010.

The electronic ticket status 1005 is information indicating the status of the electronic mail and information indicating whether or not the electronic ticket is available.

The electronic ticket property 1006 information set optionally depending on the electronic ticket type. For example, if, the electronic ticket is a coupon ticket, the remaining number of coupons is set in the electronic ticket property 1006. Whenever one coupon is used, the remaining number of coupons is decremented by one and when the remaining number of coupons reaches 0, the status of the electronic ticket status 1005 indicating au whether or not the electronic ticket is available is set to "unavailable."

The electronic ticket signature secret key 1007 is a secret key for the digital signature of the electronic ticket described above. Likewise, the electronic ticket authentication secret key 1008 is a secret key used for authentication processing of electronic ticket and the transaction terminal authentication public key 1009 is a public key used for authentication processing of the gate terminal 101.

The electronic ticket program data 1010 is a program module for stipulating the operation proper to the electronic ticket and the electronic ticket program data 1010 and the electronic ticket property 1006 can be used in combination to define various types of electronic tickets and define various types of operation in processing with electronic tickets.

Next, the shown electronic ticket 1002 is made up of an electronic ticket code 1011, an electronic ticket ID 1012, electronic ticket information 1013, an electronic ticket issuer ID 1014, and reservation information 1015. A digital signature is placed by the electronic ticket issuer on the electronic ticket code 1011, the electronic ticket ID 1012, the electronic ticket information 1013, and the electronic ticket issuer ID 1014.

The electronic ticket code 1011 is code information indicating the type of electronic ticket. The electronic ticket ID 1012 is identification information unique to each electronic ticket. The electronic ticket information 1013 is ASCII information indicating the contents of the electronic ticket; the title of the electronic ticket, the date and time, the place, the seat type, and the promoter, and information as to whether or not the electronic ticket can be transferred to another person, and if the electronic ticket is a coupon ticket, use condition information of the number of coupons at the issuing time, etc., are described with added tag information indicating the type of information.

The electronic ticket issuer ID 1014 is ID information indicating the electronic ticket issuer issuing the electronic ticket.

The reservation information 1015 is information rewritten when a reserved seat is acquired in a conveyance or an event place; information of the date and time, the seat number, etc., is set.

Next, the network electronic ticket 1003 is made up of an electronic ticket ID 1012, start page data 1016, a ticket owner secret key 1017, an electronic ticket possession certificate 1018, a network service program 1019, a bookmark list 1020, and a service status 1021. A digital signature is placed by the electronic ticket issuer on the electronic ticket ID 1012, the start page data 1016, the ticket owner secret key 1017, the electronic ticket possession certificate 1018, and the network service program 1019.

The electronic ticket ID 1012 is identification information unique to each electronic ticket.

Figure 13:
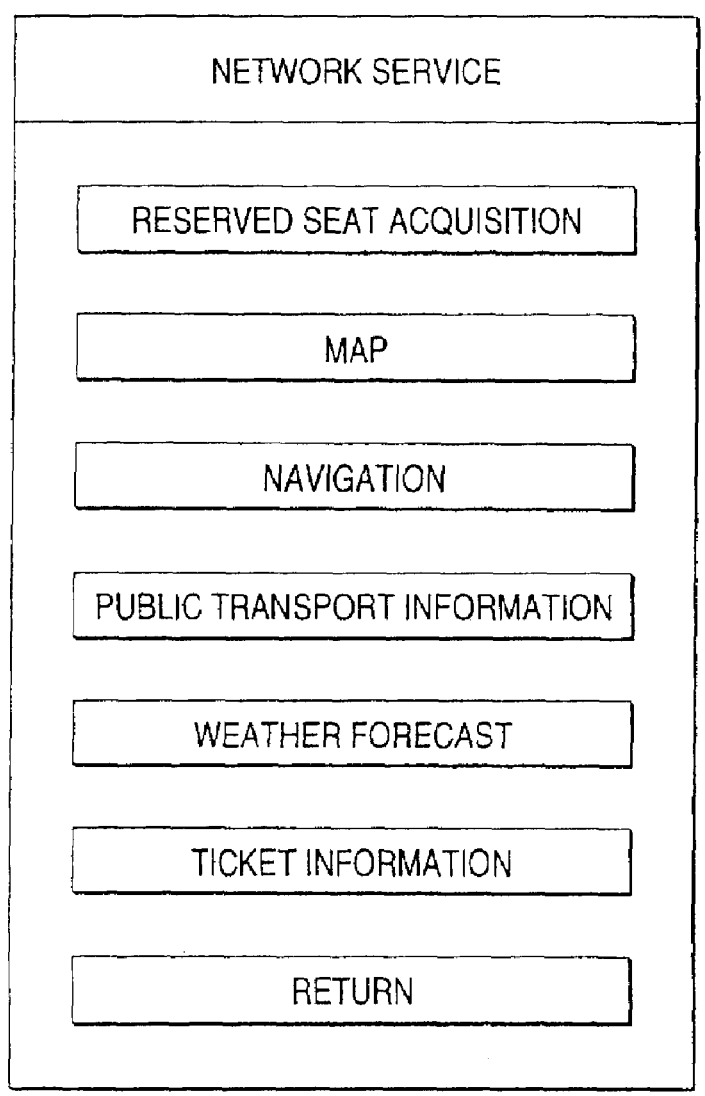
FIG. 13 is a drawing of screen display of the mobile user terminal in the embodiment of the invention.

The start page data 1016 is display information of the start page of network information service first displayed as a network service menu when the network information service is received from the electronic ticket (FIG. 13). Embedded in the display information are the names of the information services that can be received with the electronic ticket, the URL (uniform resource locator) information of the information servers for providing the information services, and the ID of each information server 103 (information server ID). Also embedded in the display information are scripts for calling program modules used for generating and processing messages exchanged with the information server 103 for providing each information service. Each script calls each program module with the URL information as a parameter. The URL information, the information server IDs, and the scripts for program execution are described in the start page data 1016 in a markup language such as HTML, XML, or WML.

The ticket owner secret key 1017 is a secret key used for authentication processing with the information server 103.

The electronic ticket possession certificate 1018 is issued by the service server 102 when the electronic ticket is purchased and is made up of the ID of the user terminal 100 through which the electronic ticket is purchased, electronic ticket ID, electronic ticket possession ID, ticket owner public key, and electronic ticket possession certificate issuing date and time. A digital signature is placed by the electronic ticket issuer on the electronic ticket possession certificate 1018.

The network service program 1019 is a program for controlling the electronic wallet when the network electronic ticket 1003 is used to receive network information service from the information server 103, and consists of program modules for generating and processing messages to receive network information service, updating the ticket, changing the service status, generating request information, etc. Each module is called by the corresponding script embedded in the start page data 1016 and is executed.

The bookmark list 1020 is a list indicating the ID of information retained locally (in the EEPROM 404) and a pointer to the local address (address on the EEPROM 404). Whenever new information is retained, a new ID and pointer are added to the list.

The service status 1021 is information indicating the status of the network electronic ticket 1003 and is list information indicating whether or not each information service displayed on the start page data 1016 can be accessed from the electronic ticket, etc.

The electronic ticket certificate 1004 is made up of electronic ticket ID, electronic ticket signature public key, electronic ticket certificate ID, electronic ticket issuer ID, and electronic ticket certificate issuing date and time. A digital signature is placed by the electronic ticket issuer on the electronic ticket certificate 1004.

Next, use of the electronic ticket in the system will be discussed with reference to FIGS. 1, 6, 7, and 8.

Figure 8:
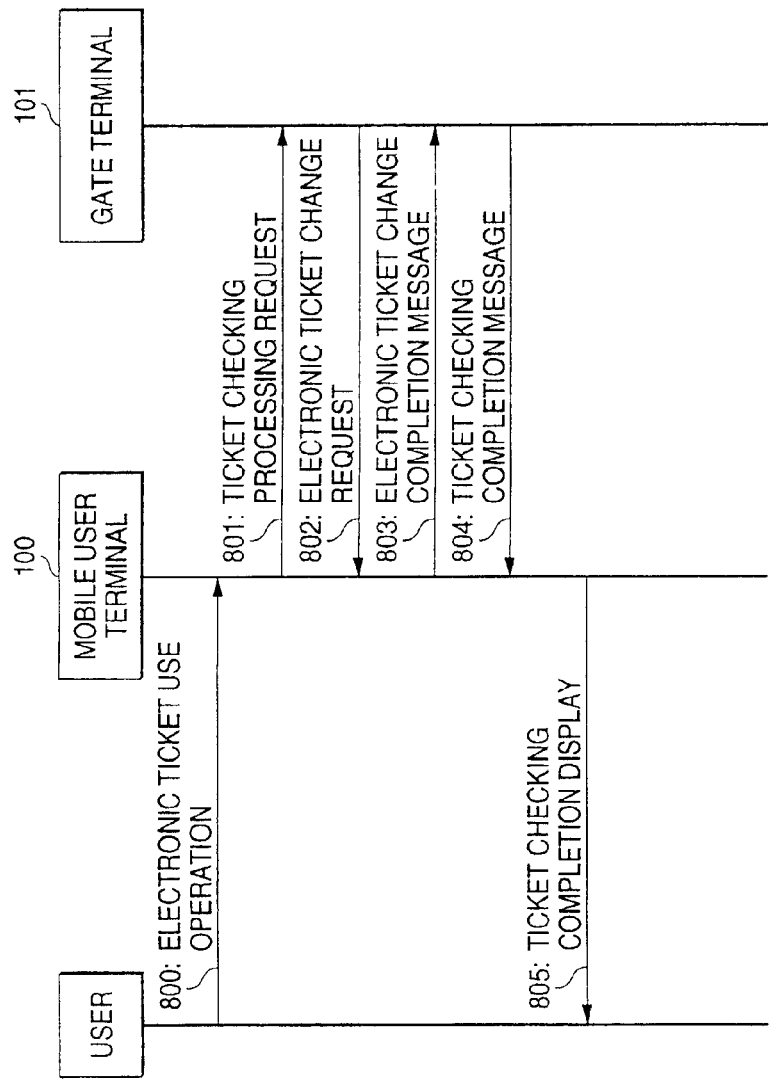
FIG. 8 is a chart of an electronic ticket checking processing procedure in the embodiment of the invention.

In the system, the electronic ticket stored in the electronic wallet in the mobile user terminal 100 is used by infrared communications between the mobile user terminal 100 and the gate terminal 101. FIG. 8 shows a processing procedure for using the electronic ticket.

Figure 6:
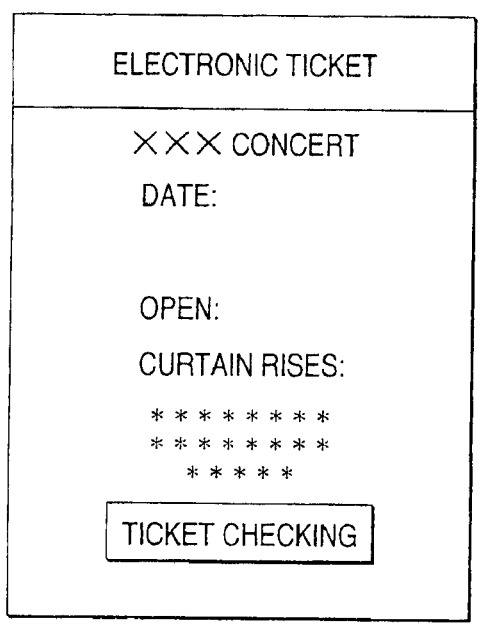
FIG. 6 is a drawing of screen display of the mobile user terminal in the embodiment of the invention.
Figure 7:
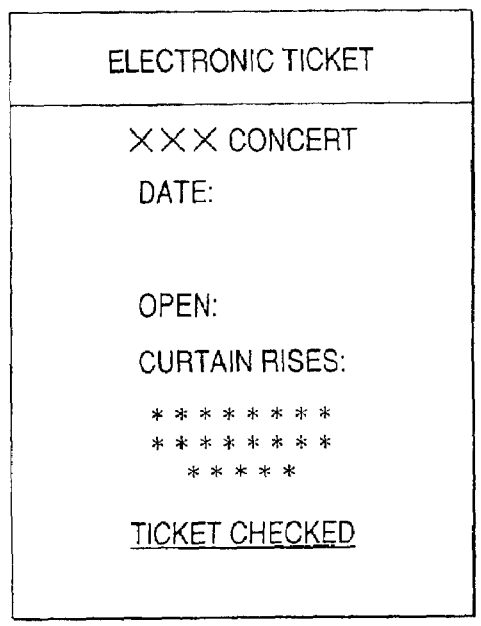
FIG. 7 is a drawing of screen display of the mobile user terminal in the embodiment of the invention.

First, the user operates the mode switch 304 to set the operation mode to the browser mode, and further calls the electronic wallet mode and selects the used ticket (the selected electronic ticket is displayed on the LCD 303 as in FIG. 6) with the function switch 307 (F1 or F2). Next, the user selects "TICKET CHECKING" in FIG. 6 and points the infrared communication port 300 at the gate terminal 101 installed at the entrance of the movie theater or the event place and presses the execution switch 311. Then, the mobile user terminal 100 transmits a ticket checking processing request 801 of the selected ticket to the gate terminal 101. If the gate terminal 101 checks that the information of the selected ticket contained in the received ticket checking processing request 801 is valid, it returns an electronic ticket change request 802 to the mobile user terminal 100. The electronic ticket change request 802 is a request for placing the ticket undergoing the ticket checking processing in "ticket checked" state to inhibit later use of the ticket and changing the ticket ID. Upon reception of the electronic ticket change request 802, the mobile user terminal 100 performs electronic ticket change processing and transmits an electronic ticket change completion message 803 to the gate terminal 101. Upon reception of the electronic ticket change completion message 803, the gate terminal 101 returns a ticket checking completion message 804 to the mobile user terminal 100. When the mobile user terminal 100 receives the ticket checking completion message 804, the ticket checking processing of the electronic ticket is now complete. At this time, the status of the electronic ticket status 1005 indicating whether or not the electronic ticket is available is set to "unavailable," and the content display of the electronic ticket is changed from "TICKET CHECKING" to "TICKET CHECKED."

Next, the network information service provided in the system will be discussed.

Figure 9:
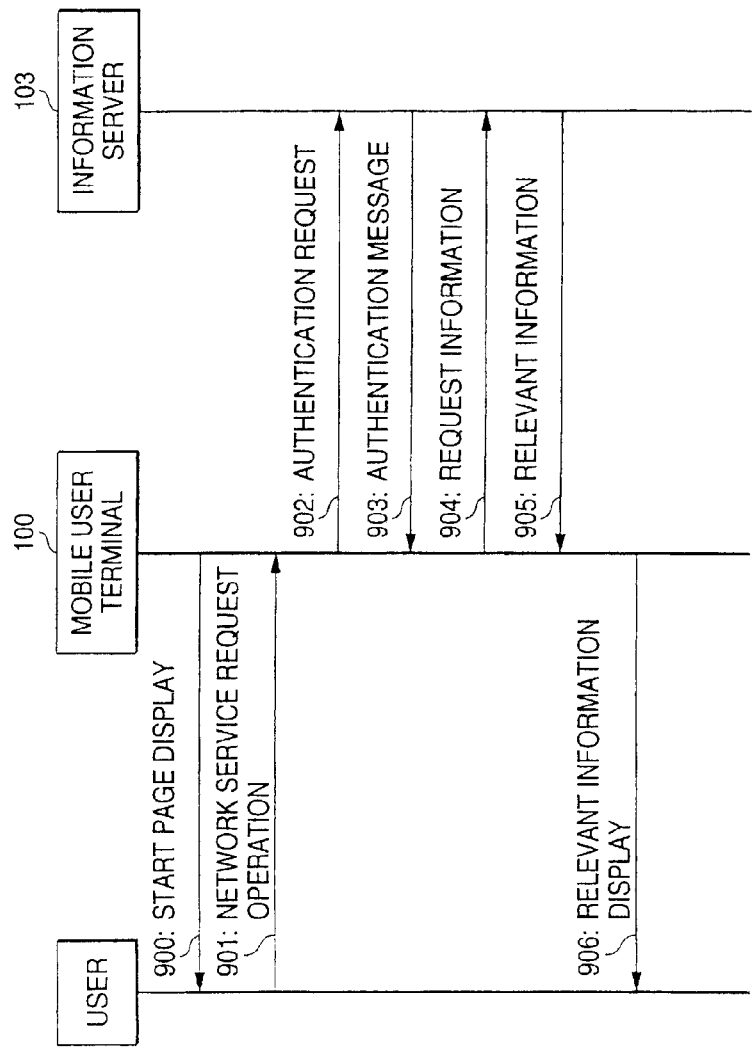
FIG. 9 is a chart of a network service processing procedure in the embodiment of the invention.

FIG. 9 shows a processing procedure for receiving the network information service.

Figure 12:
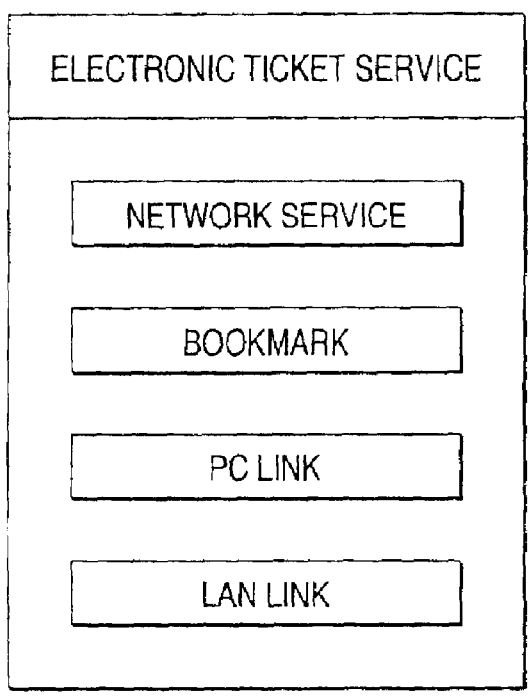
FIG. 12 is a drawing of screen display of the mobile user terminal in the embodiment of the invention.

To receive the network information service, first the user operates the mode switch 304 to set the operation mode to the browser mode and displays the electronic ticket with the function switch 307 (F1 or F2) as shown in FIG. 6. Next, the user displays a service menu with the function switch 307 (F3 or F4) (FIG. 12). If the user selects "NETWORK SERVICE" out of the service menu, the electronic wallet of the mobile user terminal 100 displays a network service menu on the LCD 303 of the mobile user terminal 100 based on the start page data 1016 of the electronic ticket (start page display 900) (FIG. 13). For example, if the user selects "MAP" (network service request operation 901), the electronic wallet of the mobile user terminal 100 generates a prompting message of authentication processing of the electronic ticket or an authentication request message 902 and transmits the message through the mobile user terminal 100 to the information server 103 indicated by the URL information embedded corresponding to "MAP" in the start page data 1016.

Upon reception of the authentication request message 902, first the information server 103 checks to see if the contents of the authentication request message 902 are valid. If the authentication request message 902 is valid, the information server 103 returns a message indicating that the electronic ticket has been authenticated or an authentication message 903 to the mobile user terminal 100.

Next, upon reception of the authentication message 903, the electronic wallet of the mobile user terminal 100 checks to see if the contents of the authentication message 903 are valid. If the authentication message 903 is valid, the electronic wallet generates information indicating which service the information server 103 is requested to provide, namely, a request information message 904 and transmits the message to the information server 103 through the mobile user terminal 100.

Upon reception of the request information message 904, the information server 103 checks to see if the contents of the request information message 904 are valid. If the request information message 904 is valid, the information server 103 returns a message containing relevant information corresponding to the user's request or a relevant information message 905 to the mobile user terminal 100.

Figure 16:
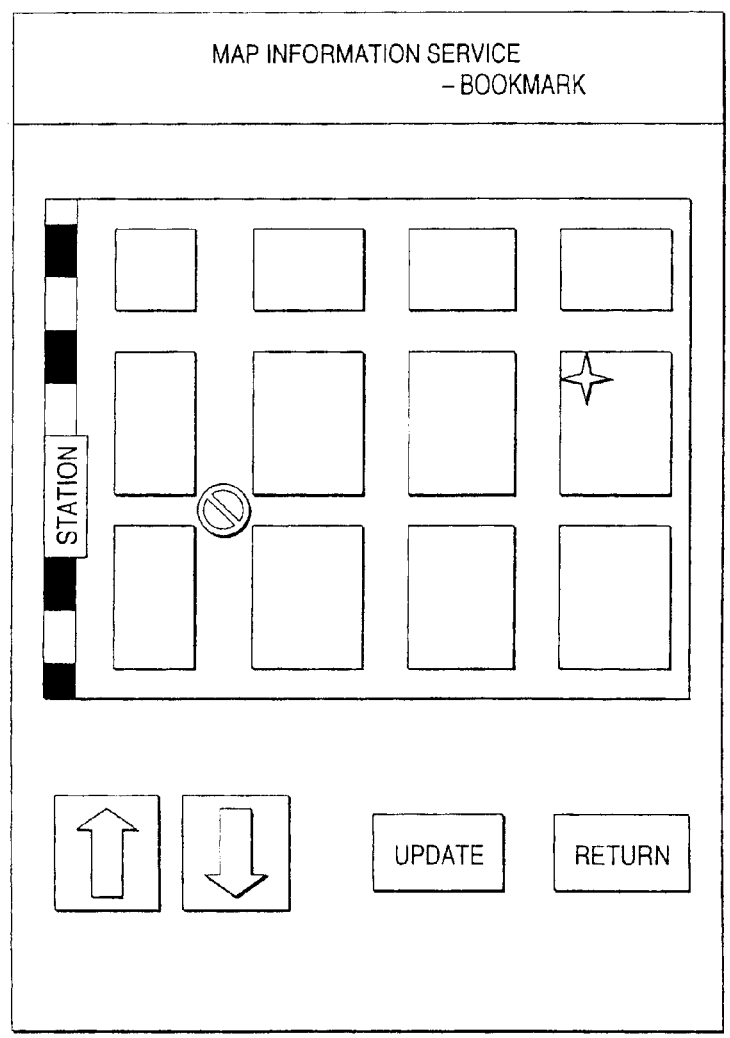
FIG. 16 is a drawing of screen display of the mobile user terminal in the embodiment of the invention.

Upon reception of the relevant information message 905, the electronic wallet of the mobile user terminal 100 checks to see if the contents of the relevant information message 905 are valid. If the relevant information message 905 is valid, the electronic wallet uses the browser program to display the relevant information in the relevant information message 905 (relevant information display 906) (FIG. 16).

Next, the messages transferred between the electronic wallet of the mobile user terminal 100 and the information server 103 in FIG. 9 will be discussed with reference to FIG. 11.

The authentication request message 902 is made up of a header 1100 indicating that the message is an authentication request message 902, issuing date and time 1101 indicating the date and time at which the authentication request message 902 was issued, a session ID 1102 used in common in one session between the mobile user terminal 100 and the information server 103, an electronic ticket code 1103 of code information indicating the electronic ticket type, an electronic ticket ID 1104 unique to each electronic ticket, a user terminal ID 1105 unique to each mobile user terminal 100 as hardware, and an electronic ticket possession certificate 1106 issued from the ticket issuer at the electronic ticket purchasing time. A digital signature is placed on the header 1100, the issuing date and time 1101, the session ID 1102, the electronic ticket code 1103, the electronic ticket ID 1104, and the user terminal ID 1105 with the ticket owner secret key 1017 obtained from the ticket issuer at the electronic ticket purchasing time. The authentication request message 902 is generated by the corresponding program module in the network service program 1019 in accordance with the network information service type.

The authentication message 903 is made up of a header 1107 indicating that the message is an authentication message 903, issuing date and time 1108 indicating the date and time at which the authentication message 903 was issued, a session ID 1109, an authentication code 1110 of code information indicating that the electronic ticket and the mobile user terminal 100 have been authenticated based on the received authentication request message 902, and an information server certificate 1111 certifying that the information server 103 is valid. A digital signature is placed on the header 1107, the issuing date and time 1108, the session ID 1109, and the authentication code 1110 with the information server secret key, and the entire message is sealed with the ticket owner public key.

The request information message 904 is made up of a header 1112 indicating that the message is a request information message 904, issuing date and time 1113 indicating the date and time at which the request information message 904 was issued, a session ID 1114, an electronic ticket ID 1104, a user terminal ID 1105, and request information 1115 indicating what information the user requests. The request information 1115 is generated by the corresponding program module in the network service program 1019 in accordance with the network information service type. A digital signature is placed on the entire message with the ticket owner secret key 1017 and further the entire message is sealed with the information server public key. The request information message 904 is generated by the corresponding program module in the network service program 1019 in accordance with the network information service type.

The relevant information message 905 is made up of a header 1116 indicating that the message is a relevant information message 905, issuing date and time 1117 indicating the date and time at which the relevant information message 905 was issued, a session ID 1118, relevant information 1119 retrieved from the database based on the request information 1115 in the request information message 904, and an instruction code 1120 of code information of a change instruction of the service status 1021. A digital signature is placed on the entire message with the information server public key and further the entire message is sealed using the ticket owner public key.

Next, processing in message exchange between the electronic wallet of the mobile user terminal 100 and the information server 103 will be discussed in detail.

If the user selects "NETWORK SERVICE" in a state in which the electronic ticket service menu is displayed, the electronic wallet of the mobile user terminal 100 displays the network service menu based on the start page data 1016 of the electronic ticket (start page display 900) (FIG. 13).

Further, if the user selects one network information service out of the network service menu (network service request operation 901), the corresponding script embedded in the start page data 1016 operates and the corresponding program module for receiving the selected information service is called form the network service program 1019 with the URL information as a parameter. The called program module first references the service status 1021 and if the program module checks that the selected information service can be accessed, it generates an authentication request message 902. The mobile user terminal 100 connects to the digital public network 104 and transmits the authentication request message 902 to the information server 103 indicated by the URL corresponding to the selected information service.

Upon reception of the authentication request message 902, the information server 103 first checks whether or not the received electronic ticket possession certificate 1106 is valid, next uses the received electronic ticket possession certificate 1106 to check that the digital signatures placed on the header 1100, the issuing date and time 1101, the session ID 1102, the electronic ticket code 1103, the electronic ticket ID 1104, and the user terminal ID 1105 are valid. Upon completion of checking the signatures, next the information server 103 checks the header 1100, the issuing date and time 1101, the session ID 1102, and the electronic ticket code 1103 for validity. Next, the information server 103 checks whether or not the electronic ticket ID 1104 matches that written on the electronic ticket possession certificate 1106. Next, the information server 103 checks whether or not the user terminal ID 1105 matches that written on the electronic ticket possession certificate 1106. If the information server 103 checks that all are valid, it authenticates that the authentication request message 902 is a message from the valid owner of the electronic ticket (mobile user terminal 100), generates an authentication message 903, and returns the message to the mobile user terminal 100.

In the electronic wallet of the mobile user terminal 100 receiving the authentication message 903, first the program module called from the network service program 1019 uses the ticket owner secret key 1017 to open the entire sealed authentication message 903. Next, the information server certificate 1111 is checked for validity. Next, the information server certificate 1111 is used to check whether or not the information server ID for providing the selected information service, embedded in the start page data 1016 is valid. Next, the information server certificate 1111 is used to check that the digital signatures placed on the header 1107, the issuing date and time 1108, the session ID 1109, and the authentication code 1110 are valid. Next, the header 1107, the issuing date and time 1108, and the session ID 1109 in the authentication message 903 are checked for validity. Next, the contents of the authentication code 1110 are checked for validity. If it is checked that the issuing date and time 1108, the session ID 1109, and the authentication code 1110 are all valid, request information is generated and a request information message 904 is created. The mobile user terminal 100 transmits the request information message 904 to the information server 103.

Upon reception of the request information message 904, first the information server 103 opens the entire sealed message with the information server secret key. Next, the information server 103 uses the electronic ticket possession certificate 1106 to check whether or not the digital signature placed on the message is valid. Next, the information server 103 checks the header 1112, the issuing date and time 1113, and the session ID 1114 for validity. Next, the information server 103 checks whether or not the electronic ticket ID 1104 and the user terminal ID 1105 match those written on the electronic ticket possession certificate 1106. If the information server 103 checks that all are valid, then it retrieves the corresponding relevant information from the database based on the contents of the received request information 1115. Upon completion of the retrieval, the information server 103 creates a relevant information message 905 and returns the message to the mobile user terminal 100.

In the electronic wallet of the mobile user terminal 100 receiving the relevant information message 905, first the program module called from the network service program uses the ticket owner secret key 1017 to open the entire sealed message. Next, the information server certificate 1111 is used to check the digital signatures placed on the entire message for validity. Next, the header 1116, the issuing date and time 1117, and the session ID 1118 are checked for validity. If it is checked that all are valid, then the service status 1021 is changed based on the contents of the instruction code 1120. The service status 1021 may be unchanged. Next, the browser program is used to display the received relevant information 1119 on the display section of the mobile user terminal 100 (FIG. 14).

The processing performed in the electronic wallet of the mobile user terminal 100 and the information server 103 for receiving the network information service has been described in detail.

In the network information service, the authentication processing between the mobile user terminal 100 and the information server 103 by exchanging the authentication request message 902 and the authentication message 903 may be skipped in the information services not requiring specification of accessible persons, such as MAP, PUBLIC TRANSPORT INFORMATION, or WEATHER FORECAST, for example, in FIG. 13. In this case, the request information message 904 and the relevant information message 905 need only be exchanged. In this case, the request information message 904 is not sealed with the information server public key and the relevant information message 905 is not sealed with the ticket owner public key.

Figure 14:
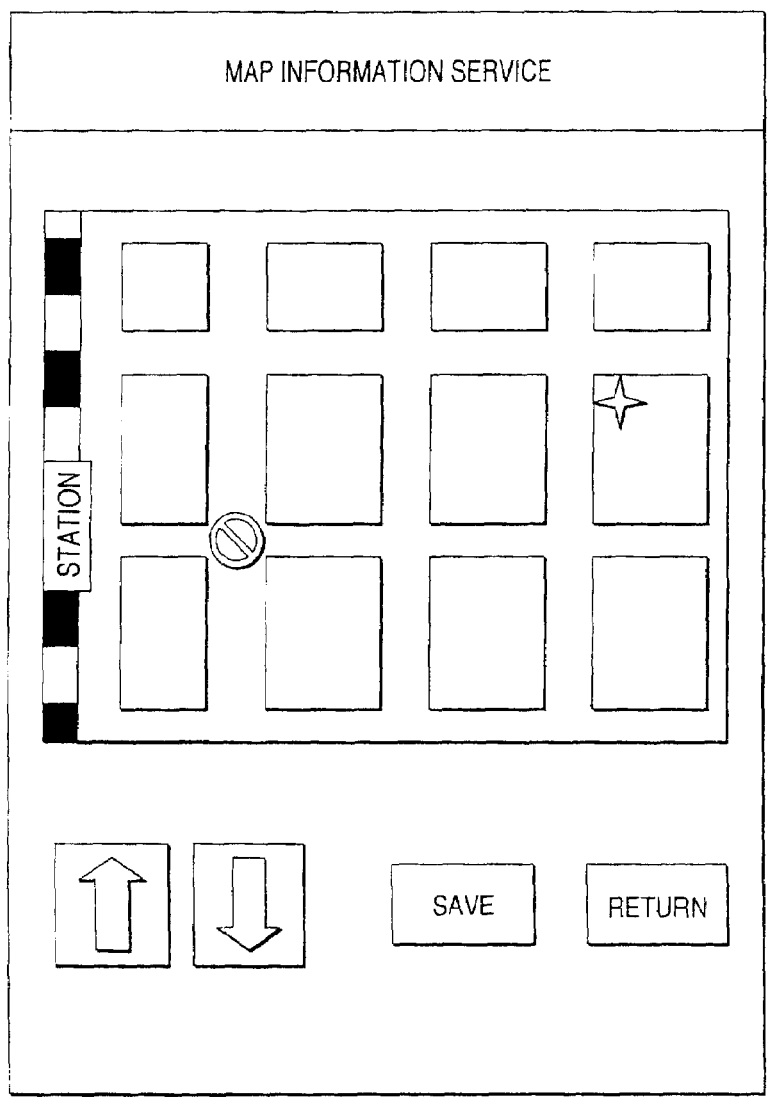
FIG. 14 is a drawing of screen display of the mobile user terminal in the embodiment of the invention.
Figure 15:
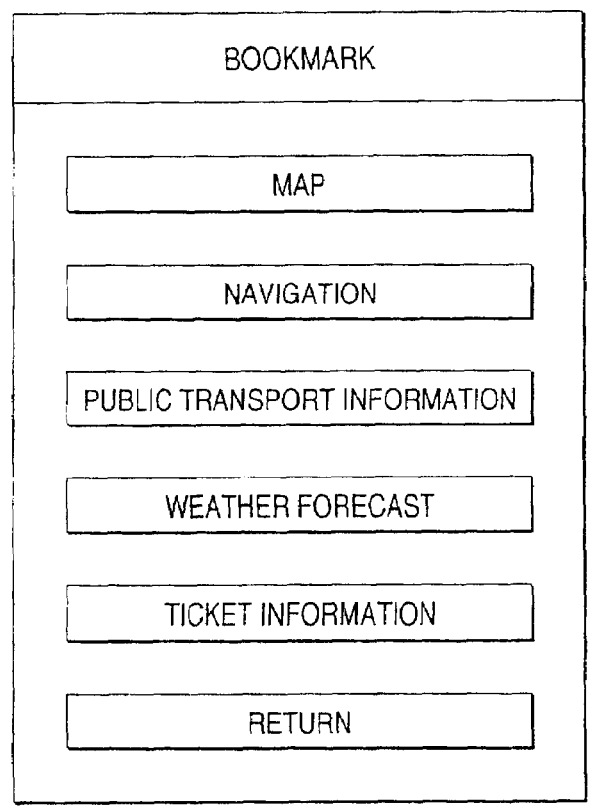
FIG. 15 is a drawing of screen display of the mobile user terminal in the embodiment of the invention.

If the user selects SAVE in FIG. 14, the current page data of the information being read and its URL information are saved in the user area 502 of the EEPROM 404. The title of the information (identification information) and the address information indicating the location of the information on the EEPROM 404 are registered in the bookmark list 1020 of the network electronic ticket. For example, if the user selects BOOKMARK in a state in which the electronic ticket service menu is displayed (FIG. 12), the information titles registered in the bookmark list 1020 are displayed as in FIG. 15. If the user selects desired information from among the information titles, the information is called from the EEPROM 404 based on the address information corresponding to the information and a screen as shown in FIG. 16 is displayed. If the user selects UPDATE in FIG. 16, the information server 103 managing the information is accessed based on the URL information embedded in the page and the information is updated to the most recent information. When the information is updated, message exchange and processing between the electronic wallet of the mobile user terminal 100 and the information server 103 are performed in a similar manner to that previously described with reference to FIG. 9.

In updating the bookmark information, the authentication processing between the mobile user terminal 100 and the information server 103 by exchanging the authentication request message 902 and the authentication message 903 may be skipped in the information services not requiring specification of accessible persons. In this case, the request information message 904 and the relevant information message 905 need only be exchanged. In this case, the request information message 904 is not sealed with the information server public key and the relevant information message 905 is not sealed with the ticket owner public key.

Next, reception of navigation service to an event place, etc., using the network information service will be discussed.

To receive the navigation service in the network information service, first the user operates the mode switch 304 to set the operation mode to the browser mode and displays the electronic ticket with the function switch 307 (F1 or F2) as shown in FIG. 6. Next, the user displays a service menu of the ticket with the function switch 307 (F3 or F4) (FIG. 12). If the user selects "NETWORK SERVICE" out of the service menu, the electronic wallet of the mobile user terminal 100 displays a network service menu (FIG. 13). If the user selects "NAVIGATION," the electronic wallet of the mobile user terminal 100 transmits a prompting message of authentication processing of the electronic ticket or an authentication request message 902 to the information server 103 for providing the navigation service.

Upon reception of the authentication request message 902, first the information server 103 checks to see if the contents of the authentication request message 902 are valid. If the authentication request message 902 is valid, the information server 103 returns a message indicating that the electronic ticket has been authenticated or an authentication message 903 to the mobile user terminal 100. Next, upon reception of the authentication message 903, the electronic wallet of the mobile user terminal 100 first checks to see if the contents of the authentication message 903 are valid. If the authentication message 903 is valid, the electronic wallet transmits a request information message 904 containing information indicating that the information server 103 is requested to provide the navigation service and position information of the mobile user terminal 100 calculated by the GPS computation section 405 to the information server 103.

Upon reception of the request information message 904, the information server 103 first checks to see if the contents of the request information message 904 are valid. If the request information message 904 is valid, the information server 103 returns a message containing navigation information or a relevant information message 905 to the mobile user terminal 100.

Figure 18:
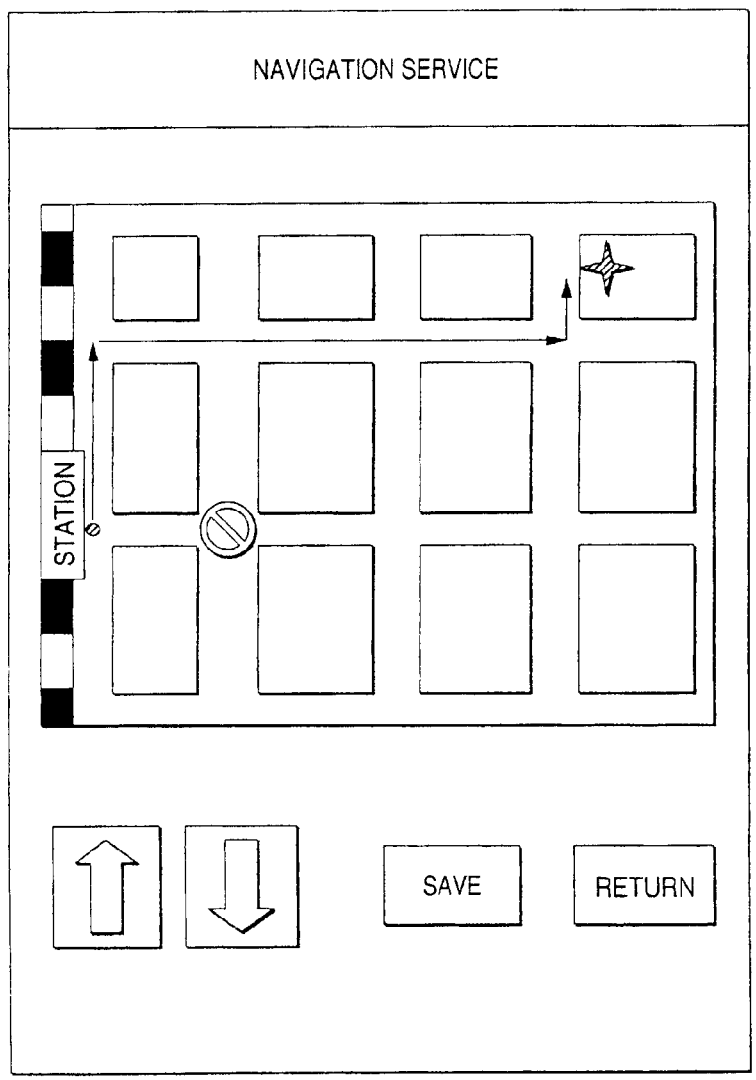
FIG. 18 is a drawing of screen display of the mobile user terminal in the embodiment of the invention.

Upon reception of the relevant information message 905, the electronic wallet of the mobile user terminal 100 first checks to see if the contents of the relevant information message 905 are valid. If the relevant information message 905 is valid, the electronic wallet uses the browser program to display the relevant information in the relevant information message 905 (navigation information) (FIG. 18).

Then, the navigation service in the network information service is provided by repeating transfer of the request information message 904, transfer of the relevant information message 905, and display of the relevant information (relevant information display 906) between the electronic wallet of the mobile user terminal 100 and the information server 103 at one interval.

Figure 21:
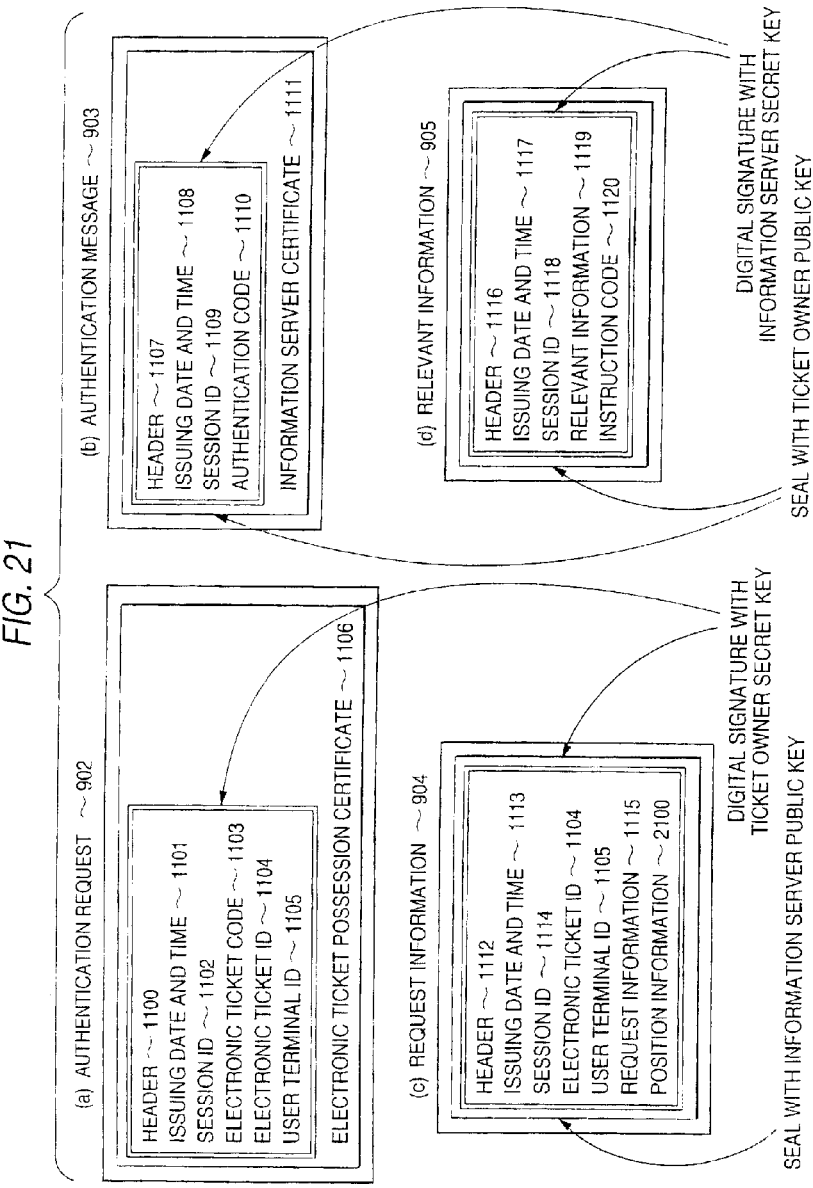
FIG. 21 is a data structure drawing of messages in the embodiment of the invention.

FIG. 21 shows the authentication request message 902, the authentication message 903, the request information message 904, and the relevant information message 905 transferred between the electronic wallet of the mobile user terminal 100 and the information server 103 according to the procedure in FIG. 9 at the time. The authentication request message 902, the authentication message 903, and the relevant information message 905 are the same as those shown in FIG. 11.

The request information message 904 is made up of a header 1112 indicating that the message is a request information message 904, issuing date and time 1113 indicating the date and time at which the request information message 904 was issued, a session ID 1114, an electronic ticket ID 1104, a user terminal ID 1105, request information 1115 indicating what information the user requests, and position information 2100 indicating the current position of the mobile user terminal 100 measured by the GPS computation section 405 based on the information received at the GPS antenna 315. The request information 1115 and the position information 2100 are generated by the program module corresponding to the navigation service in the network service program 1019. A digital signature is placed on the entire message with the ticket owner secret key 1017 and further the entire message is sealed with the information server public key. The request information message 904 is generated by the program module corresponding to the navigation service in the network service program 1019.

Next, processing in message exchange between the electronic wallet of the mobile user terminal 100 and the information server 103 will be discussed in detail.

If the user selects "NETWORK SERVICE" in a state in which the electronic ticket service menu is displayed, the electronic wallet of the mobile user terminal 100 displays the network service menu based on the start page data 1016 of the electronic ticket (start page display 900) (FIG. 13).

Further, if the user selects NAVIGATION out of the network service menu (network service request operation 901), the corresponding script embedded in the start page data 1016 operates and the corresponding program module for receiving the selected navigation service is called form the network service program 1019 with the URL information as a parameter. The called program module first references the service status 1021 and if the program module checks that the navigation service can be received, it generates an authentication request message 902. The mobile user terminal 100 connects to the digital public network 104 and transmits the authentication request message 902 to the information server 103 for providing the navigation service.

Upon reception of the authentication request message 902, the information server 103 checks whether or not the authentication request message 902 is valid. This operation is the same as that for the authentication request message 902 previously described with reference to FIG. 11. After checking that the authentication request message 902 is valid, the information server 103 generates an authentication message 903, and returns the message to the mobile user terminal 100.

Upon reception of the authentication message 903, the electronic wallet of the mobile user terminal 100 checks whether or not the authentication message 903 is valid. This operation is the same as that for the authentication message 903 previously described with reference to FIG. 11. After checking that the authentication message 903 is valid, the electronic wallet of the mobile user terminal 100 generates request information 1115 and position information 2100 and transmits a request information message 904 to the information server 103.

Upon reception of the request information message 904, the information server 103 checks whether or not the request information message 904 is valid. This operation is the same as that for the request information message 904 previously described with reference to FIG. 11. After checking that the request information message 904 is valid, the information server 103 generates a map matched with the position information 2100 based on the contents of the received request information 1115 and position information 2100 and creates relevant information (navigation information) 1119. Then, the information server 103 returns a relevant information message 905 containing the relevant information 1119 to the mobile user terminal 100.

Upon reception of the relevant information message 905, the electronic wallet of the mobile user terminal 100 checks whether or not the relevant information message 905 is valid. This operation is the same as that for the relevant information message 905 previously described with reference to FIG. 1. After checking that the relevant information message 905 is valid, the electronic wallet changes the service status 1021 based on the contents of the instruction code 1120. The service status 1021 may be unchanged. Next, the electronic wallet uses the browser program to display the received relevant information (navigation information) 1119 on the display section of the mobile user terminal 100 (FIG. 18).

In the electronic wallet of the mobile user terminal 100, after the relevant information (navigation information) 1119 is displayed, at one interval, the program module called form the network service program 1019 again acquires the position information 2100 of the current position of the mobile user terminal 100 measured by the GPS computation section 405 based on the information received from the GPS satellite and creates a request information message 904 based on the position information 2100. The mobile user terminal 100 transmits the request information message 904 to the information server 103.

Upon reception of the request information message 904, the information server 103 creates a new relevant information message 905 from the contents of the new position information 2100 and returns the message to the mobile user terminal 100.

Upon reception of the relevant information message 905, the electronic wallet of the mobile user terminal 100 displays new relevant information 1119 based on the contents of the relevant information message 905.

Thus, to receive the navigation service in the network information service, the electronic wallet of the mobile user terminal 100 and the information server 103 repeat creation and transfer of the request information message 904, creation and transfer of the relevant information message 905, and display of the request information 1115 on the mobile user terminal 100 at one interval, thereby providing the real-time navigation for the user.

The processing performed in the electronic wallet of the mobile user terminal 100 and the information server 103 for receiving the navigation service in the network information service has been described in detail.

Figure 30:
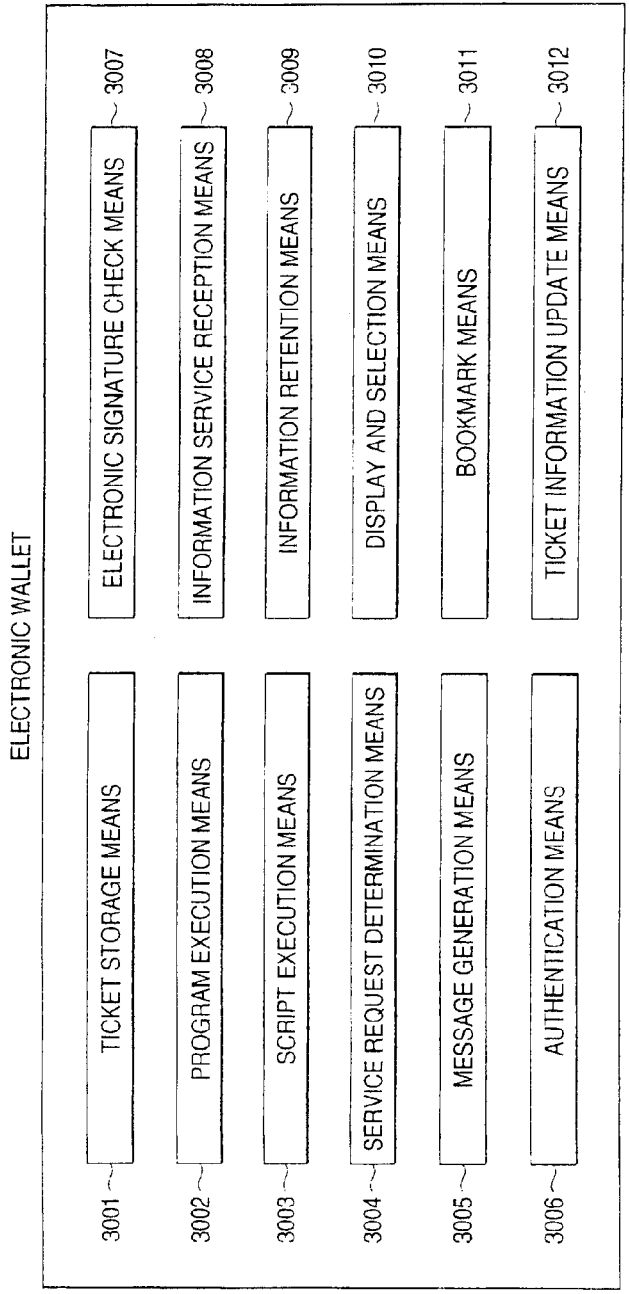
FIG. 30 is a block diagram to show the configuration of an electronic wallet in first, second, and third embodiments of the invention.

FIG. 30 summarizes the means (functions) of the electronic wallet for receiving the network information service.

First, the electronic wallet has ticket storage means 3001 for storing network-linked electronic tickets containing electronic tickets and network electronic tickets.

The electronic wallet also has program execution means 3002 for executing a program contained in the network electronic ticket.

The electronic wallet also has script execution means 3003 for interpreting a script for calling a program module contained in the start page data of the network electronic ticket and prompting the program execution means 3002 to execute the called program.

The electronic wallet also has service request determination means 3004 for determining whether or not the information server is to be requested to provide network information service based on the information contained in the network electronic ticket indicating whether or not the network information service provided by the network electronic ticket can be provided.

The electronic wallet also has message generation means 3005 for generating a message exchanged with the information server based on the program contained in the network electronic ticket.

The electronic wallet also has authentication means 3006 for requesting the information server to perform authentication processing of the network electronic ticket.

The electronic wallet also has electronic signature check means 3007 for checking whether or not the electronic signature placed on the information acquired from the information server is valid.

The electronic wallet also has information service reception means 3008 for receiving the network information service from the information server 103 via communication means of the mobile user terminal 100.

The electronic wallet also has information retention means 3009 for controlling storage of information provided by the network information service.

The electronic wallet also has display and selection means 3010 for displaying the information contained in the electronic ticket and the information received from the information server on the display section of the mobile user terminal and selecting the user-specified entry.

The electronic wallet also has bookmark means 3011 for registering the identification information of the information provided by the network information service in the network electronic ticket used at the time.

The electronic wallet also has ticket information update means 3012 for updating the service status of the electronic ticket and the network electronic ticket based on the information received from the information server.

The electronic wallet is stored in the ROM 402 or the EEPROM 404. The means of the electronic wallet are also executed in association with the CPU, the RAM, etc., of an IC card of the mobile user terminal.

The "bookmark" recorded on the network electronic ticket can be used as follows:

For example, if the electronic ticket is an event ticket, the user selects the MAP menus item and uses the map information service to display the map of the event place. At this time, the user makes the range and the scale of the map easy to see and registers in the bookmark. In doing so, if the user selects the registered bookmark later, the map easy to see can be displayed directly for the user.

The bookmark is thus recorded on the network electronic ticket, whereby a high value can be added to the electronic ticket.

Information as to whether or not a service request can be accepted is recorded on the network electronic ticket as the service status, whereby it is made possible for the service provider to control the use of the network service for each user. For example, if the electronic ticket is a business ticket of the Shinkansen a reserved seat of which can be acquired, when the user uses the network service to acquire a reserved seat, the service status is changed and it is made impossible to receive the "reserved seat acquisition" service with the ticket.

For example, if the electronic ticket is a concert ticket, as the user uses several network services, the service status is changed, enabling the user to listen to an interview of the artist or access a special site. After the concert ends, the service status is changed, enabling the user to access a network service that cannot be accessed before the concert is held and listen to an interview of the artist after the concert.

The service status is thus recorded on the network electronic ticket, whereby it is made possible to define the use mode of the network service in response to the status of the electronic ticket, and a high value can be added to the electronic ticket.

As described above, in the embodiment, the network electronic ticket is provided in the network-linked electronic ticket, whereby the network information service can be received directly from the electronic ticket.

As the data structure of the network electronic ticket, the start page data, the electronic ticket possession certificate, and the network service program are provided and further a script for prompting execution of a network service program is embedded in the start page data, whereby it is made possible to safely receive the network information service from the electronic ticket; the convenience of the user can be enhanced.

The mobile user terminal (electronic wallet) for storing the network-linked electronic ticket having the described functions is provided with the means for executing the described functions of the network-linked electronic ticket, whereby it is made possible to safely receive the network information service from the electronic ticket; the convenience of the user can be enhanced.

Second Embodiment

In a second embodiment of the invention, adding and updating of information in an electronic ticket through network information service will be discussed.

Specifically, acquiring of a reserved seat through network information service after a ticket having no seat information is purchased in an electronic ticket of a conveyance, an event, a movie theater, etc., will be discussed.

Figure 19:
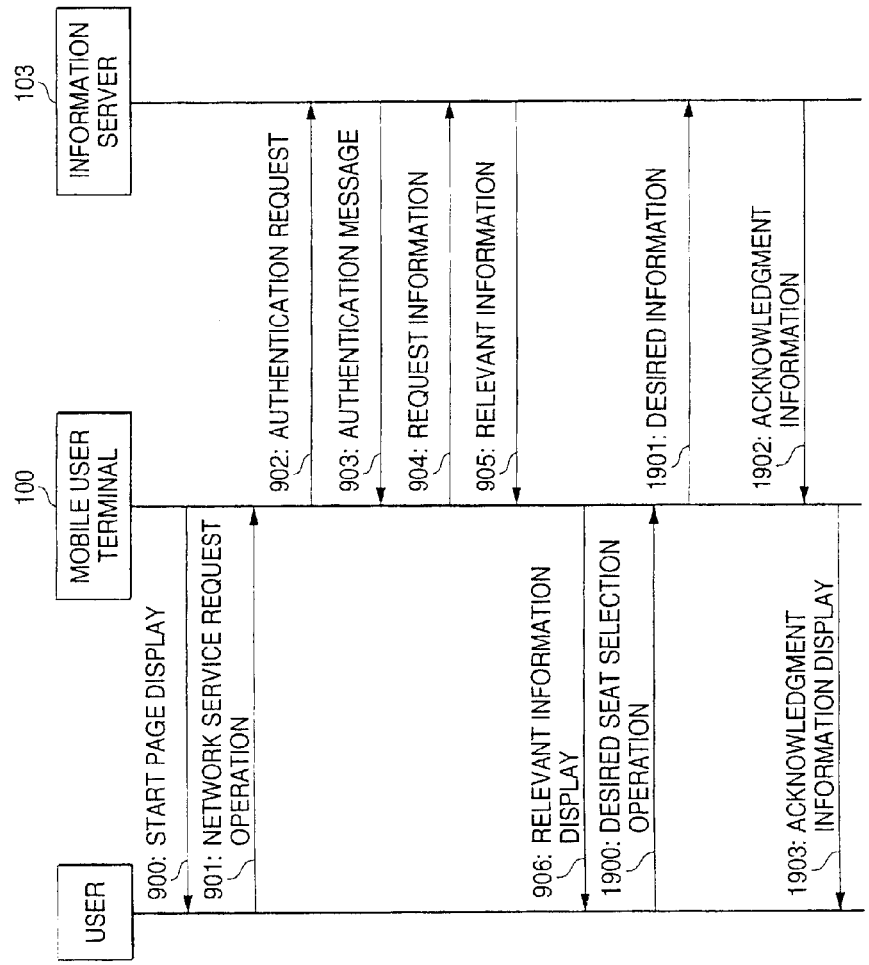
FIG. 19 is a chart of a procedure of acquiring a reserved seat in first, second, and fourth embodiments of the invention.

FIG. 19 shows a procedure of acquiring a reserved seat.

To acquire a reserved seat in the network information service, first the user operates the mode switch 304 to set the operation mode to the browser mode and displays the electronic ticket with the function switch 307 (F1 or F2) as shown in FIG. 6. Next, the user displays a service menu of the ticket with the function switch 307 (F3 or F4) (FIG. 12). If the user selects "NETWORK SERVICE" out of the service menu, the electronic wallet of the mobile user terminal 100 displays a network service menu (FIG. 13). If the user selects "RESERVED SEAT ACQUISITION," the electronic wallet of the mobile user terminal 100 transmits a prompting message of authentication processing of the electronic ticket or an authentication request message 902 to the information server 103.

Upon reception of the authentication request message 902, first the information server 103 checks to see if the contents of the authentication request message 902 are valid. If the authentication request message 902 is valid, the information server 103 returns a message indicating that the electronic ticket has been authenticated or an authentication message 903 to the mobile user terminal 100.

Upon reception of the authentication message 903, the electronic wallet of the mobile user terminal 100 first checks to see if the contents of the authentication message 903 are valid. If the authentication message 903 is valid, the electronic wallet transmits information indicating that the information server 103 is requested to provide reserved seat acquisition service, namely, a request information message 904 to the information server 103.

Upon reception of the request information message 904, the information server 103 first checks to see if the contents of the request information message 904 are valid. If the request information message 904 is valid, the information server 103 retrieves seat information from the database for managing reserved seats, creates relevant information (vacant seat information), and returns a message containing the vacant seat information or a relevant information message 905 to the mobile user terminal 100.

Figure 17:
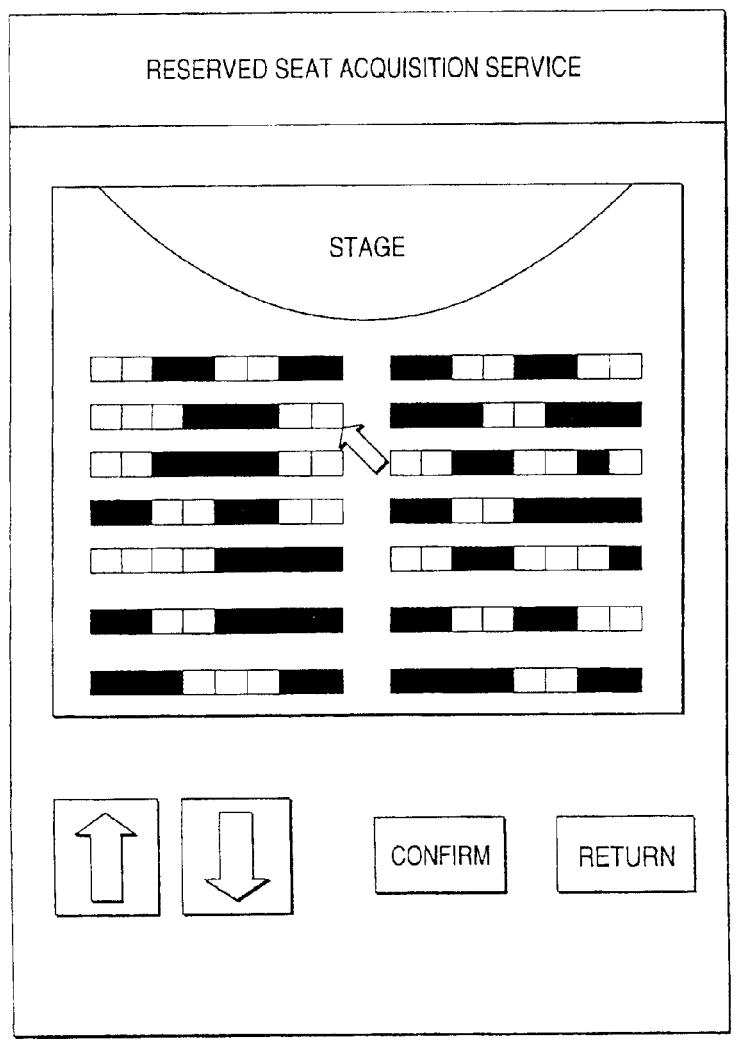
FIG. 17 is a drawing of screen display of the mobile user terminal in the embodiment of the invention.

Upon reception of the relevant information message 905, the electronic wallet of the mobile user terminal 100 first checks to see if the contents of the relevant information message 905 are valid. If the relevant information message 905 is valid, the electronic wallet uses the browser program to display the relevant information in the relevant information message 905 (vacant seat information) (FIG. 17).

The user selects any desired seat based on the displayed vacant seat information (desired seat selection operation 1900) (function key 307 and execution key 311). The electronic wallet of the mobile user terminal 100 transmits a message containing the user's desired seat information based on the user's selection or a desired information message 1901 to the information server 103.

Upon reception of the desired information message 1901, the information server 103 first checks to see if the desired information message 1901 is valid. If the desired information message 1901 is valid, the information server 103 performs seat acquisition processing based on the contents of the desired information and returns a message indicating completion of the seat acquisition processing, namely, an acknowledgement information message 1902 to the mobile user terminal 100.

Upon reception of the acknowledgement information message 1902, the electronic wallet of the mobile user terminal 100 first checks to see if the acknowledgement information message 1902 is valid. If the acknowledgement information message 1902 is valid, the electronic wallet displays the updated vacant seat information based on the information in the acknowledgement information message 1902 for the user (acknowledgement information display 1903).

Next, the messages will be discussed.

Figure 11:
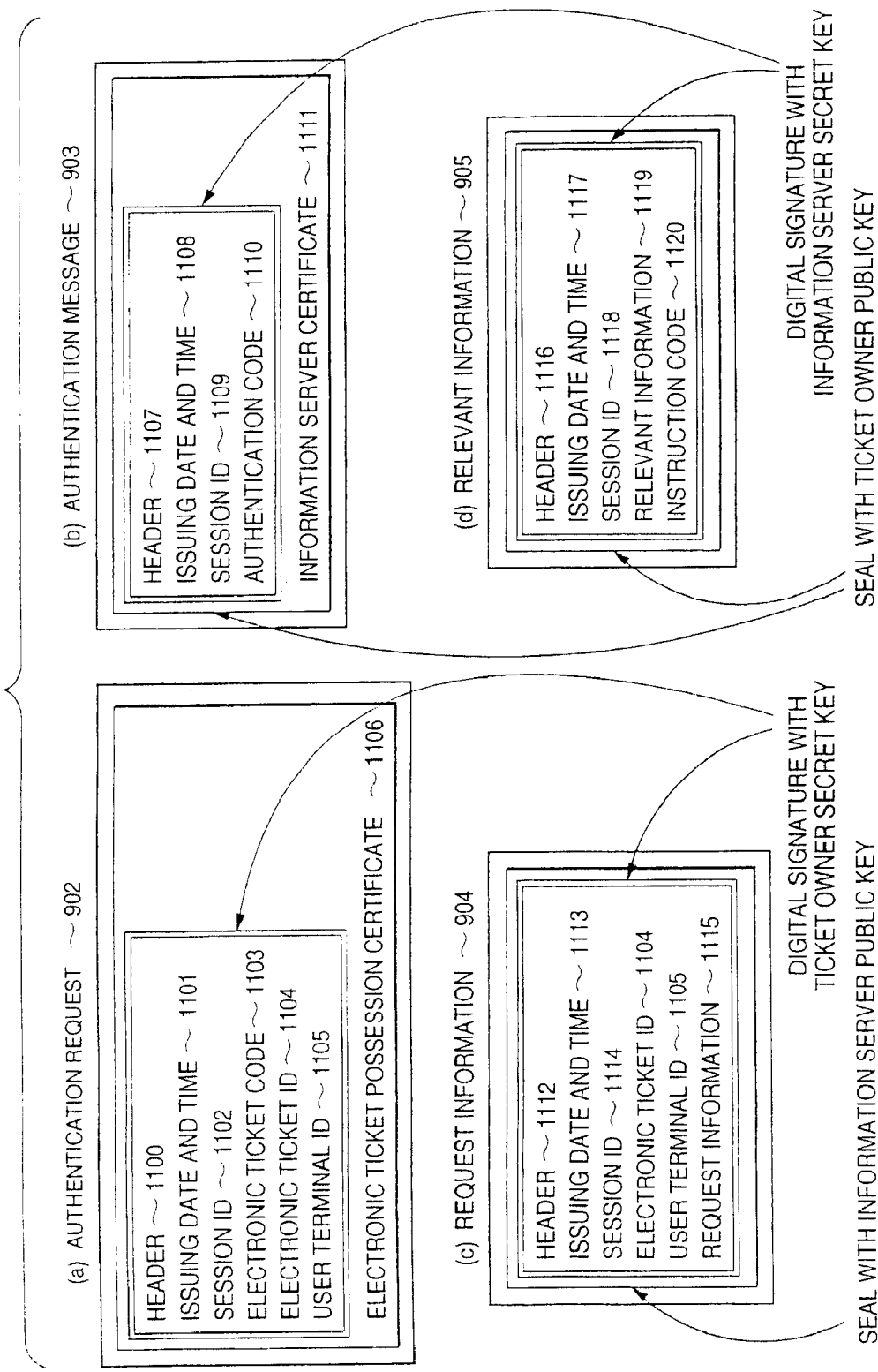
FIG. 11 is a data structure drawing of messages in first, second, and fourth embodiments of the invention.

The authentication request message 902, the authentication message 903, the request information message 904, and the relevant information message 905 have the same data structures as those shown in FIG. 11.

Figure 20:
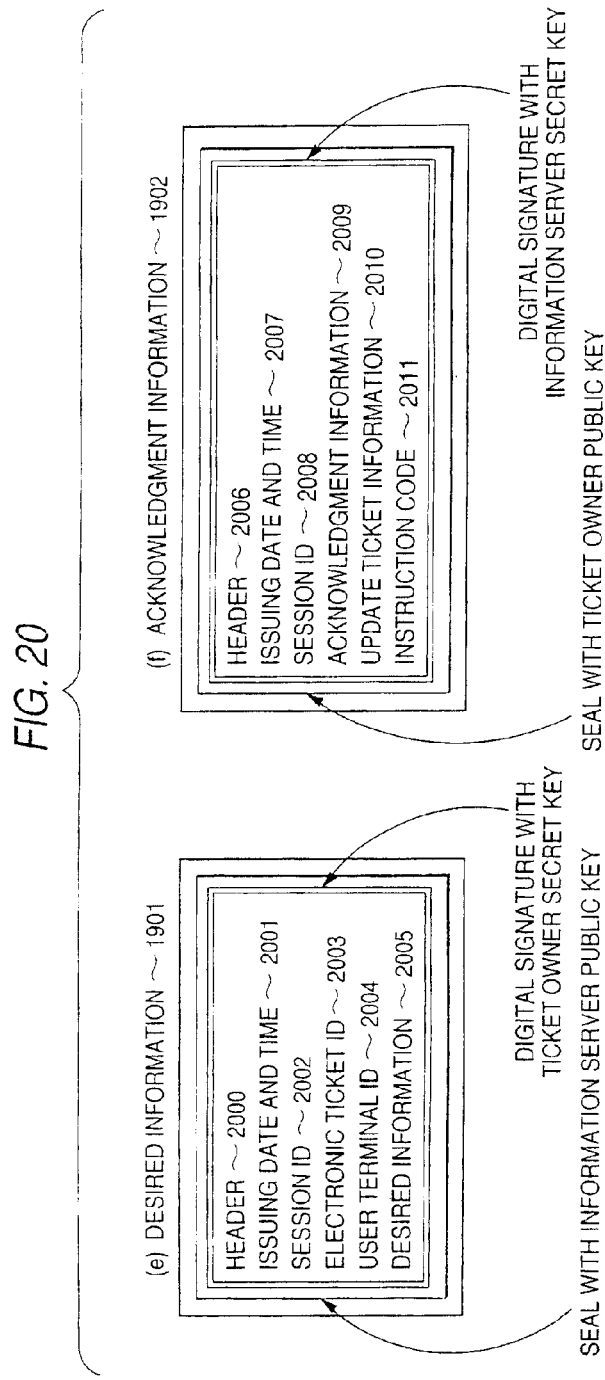
FIG. 20 is a data structure drawing of messages in first, second, and fourth embodiments of the invention.

As shown in FIG. 20, the desired information message 1901 is made up of a header 2000 indicating that the message is a desired information message 904, issuing date and time 2001 indicating the date and time at which the desired information message was issued, a session ID 2002, an electronic ticket ID 2003, a user terminal ID 2004, and desired information 2005 indicating the user's desired seat. The desired information 2005 is generated by the program module corresponding to the reserved seat acquisition service in the network service program 1019. A digital signature is placed on the entire message with the ticket owner secret key 1017 and further the entire message is sealed with the information server public key. The desired information message 1901 is generated by the program module corresponding to the reserved seat acquisition service in the network service program 1019.

The acknowledgement information message 1902 is made up of a header 2006 indicating that the message is an acknowledgement information message 1902, issuing date and time 2007 indicating the date and time at which the acknowledgement information message 1902 was issued, a session ID 2008, acknowledgment information 2009 indicating whether or not the user's desired seat can be acquired (available), update ticket information 2010 for updating the reservation information 1015 of the ticket, and an instruction code 2011 of code information of a change instruction of the service status 1021. A digital signature is placed on the entire message with the information server secret key and further the entire message is sealed with the ticket owner public key.

If the acquisition of the seat is established, the reservation information 1015 of the ticket displayed for the user is updated to the update ticket information 2010 by the program module corresponding to the reserved seat acquisition service, called from the network service program 1019.

Next, processing in message exchange between the electronic wallet of the mobile user terminal 100 and the information server 103 will be discussed in detail.

If the user selects "NETWORK SERVICE" in a state in which the electronic ticket service menu is displayed, the electronic wallet of the mobile user terminal 100 displays the network service menu based on the start page data 1016 of the electronic ticket (start page display 900) (FIG. 13).

Further, if the user selects "RESERVED SEAT ACQUISITION" out of the network service menu (network service request operation 901), the corresponding script embedded in the start page data 1016 operates and the program module corresponding to the reserved seat acquisition service is called form the network service program 1019 with the URL information as a parameter. The called program module first references the service status 1021 and if the program module checks that the reserved seat acquisition service can be accessed, it generates an authentication request message 902. The mobile user terminal 100 connects to the digital public network 104 and transmits the authentication request message 902 to the information server 103 indicated by the URL corresponding to the reserved seat acquisition service.

Upon reception of the authentication request message 902, the information server 103 checks whether or not the authentication request message 902 is valid. This operation is the same as that for the authentication request message 902 previously described with reference to FIG. 11. After checking that the authentication request message 902 is valid, the information server 103 generates an authentication message 903, and returns the message to the mobile user terminal 100.

Upon reception of the authentication message 903, the electronic wallet of the mobile user terminal 100 checks whether or not the authentication message 903 is valid. This operation is the same as that for the authentication message 903 previously described with reference to FIG. 11. After checking that the authentication message 903 is valid, the electronic wallet of the mobile user terminal 100 creates a request information message 904 and transmits the message to the information server 103.

Upon reception of the request information message 904, the information server 103 checks whether or not the request information message 904 is valid. This operation is the same as that for the request information message 904 previously described with reference to FIG. 11. Next, the information server 103 retrieves the seat information from the database based on the contents of the received request information 111, generates relevant information (vacant seat information), creates a relevant information message 905, and returns the message to the mobile user terminal 100.

Upon reception of the relevant information message 905, the electronic wallet of the mobile user terminal 100 checks to see if the relevant information message 905 is valid. This operation is the same as that for the relevant information message 905 previously described with reference to FIG. 11. Next, the electronic wallet of the mobile user terminal 100 changes the service status 1021 based on the contents of the instruction code 1120. The service status 1021 may be unchanged. Next, the electronic wallet uses the browser program to display the received relevant information (vacant seat information) 1119 on the display section of the mobile user terminal 100 (FIG. 17).

In relevant information display 906, the mobile user terminal 100 displays a screen as shown in FIG. 17. The user selects any desired seat and selects "CONFIRM" in FIG. 17, whereby in the electronic wallet of the mobile user terminal 100, the program module corresponding to the reserved seat acquisition service, called form the network service program 1019 generates desired information and creates a desired information message 1901 and the mobile user terminal 100 transmits the desired information message 1901 to the information server 103.

Upon reception of the desired information message 1901, the information server 103 first opens the sealed message with the information server secret key and checks the digital signature for validity with the ticket owner public key. Next, the information server 103 checks the header 2000, the issuing date and time 2001, and the session ID 2002 for validity. Next, the information server 103 uses the electronic ticket possession certificate 1108 to check the electronic ticket ID 2003 and the user terminal ID 2004 for validity. If the information server 103 checks that all are valid, then it performs seat acquisition processing for the specified vacant seat based on the desired information 2005. Next, the information server 103 creates an acknowledgement information message 1902 and returns the message to the mobile user terminal 100.

In the electronic wallet of the mobile user terminal 100 receiving the acknowledgement information message 1902, the program module corresponding to the reserved seat acquisition service, called from the network service program 1019 first opens the sealed message with the ticket owner secret key 1017 and checks the digital signature for validity with the information server public key. Next, the header 2005, the issuing date and time 2006, and the session ID 2007 are checked for validity. Next, the contents of the acknowledgement information 2007 are checked for validity. If it is checked that all are valid, then the reservation information 1015 in the shown electronic ticket 1002 of the network-linked electronic ticket 1000 is updated based on the received update ticket information 2008.

Since the information of the seat number, etc., is not described on the original electronic ticket, the acquired seat information to be added is written in the update ticket information 2008 and only the acquired seat information in the update ticket information 2008 is added to the reservation information 1015 in the shown electronic ticket 1002 of the original network-linked electronic ticket 1000. The service status 1021 is changed to "inaccessible" to the reserved seat acquisition service. The electronic wallet of the mobile user terminal 100 displays a new page indicating how seats are vacant on the display section of the mobile user terminal 100.

The procedure of adding, updating a part of the information in the shown electronic ticket for receiving the reserved seat acquisition service of the network information service has been described. In this case, the ticket information update means 3012 of the electronic wallet updates the service status 1021 and the reservation information 1015 of the electronic ticket based on the information received from the information server.

As described above, in the embodiment, in addition to the advantages provided in the first embodiment, it is made possible to safely change the information in the electronic ticket through the network information service, whereby specifically it is made possible to acquire a reserved seat through the network information service after a ticket having no seat information is purchased; the convenience of the user can be enhanced. Thus, a large practical advantage can be provided.

Third Embodiment

In a third embodiment of the invention, to acquire a reserved seat through network information service after an electronic ticket having no seat information of a conveyance, an event, a movie theater, etc., is purchased, a system for reissuing an electronic ticket with a seat reserved from a service server will be discussed.

Figure 25:
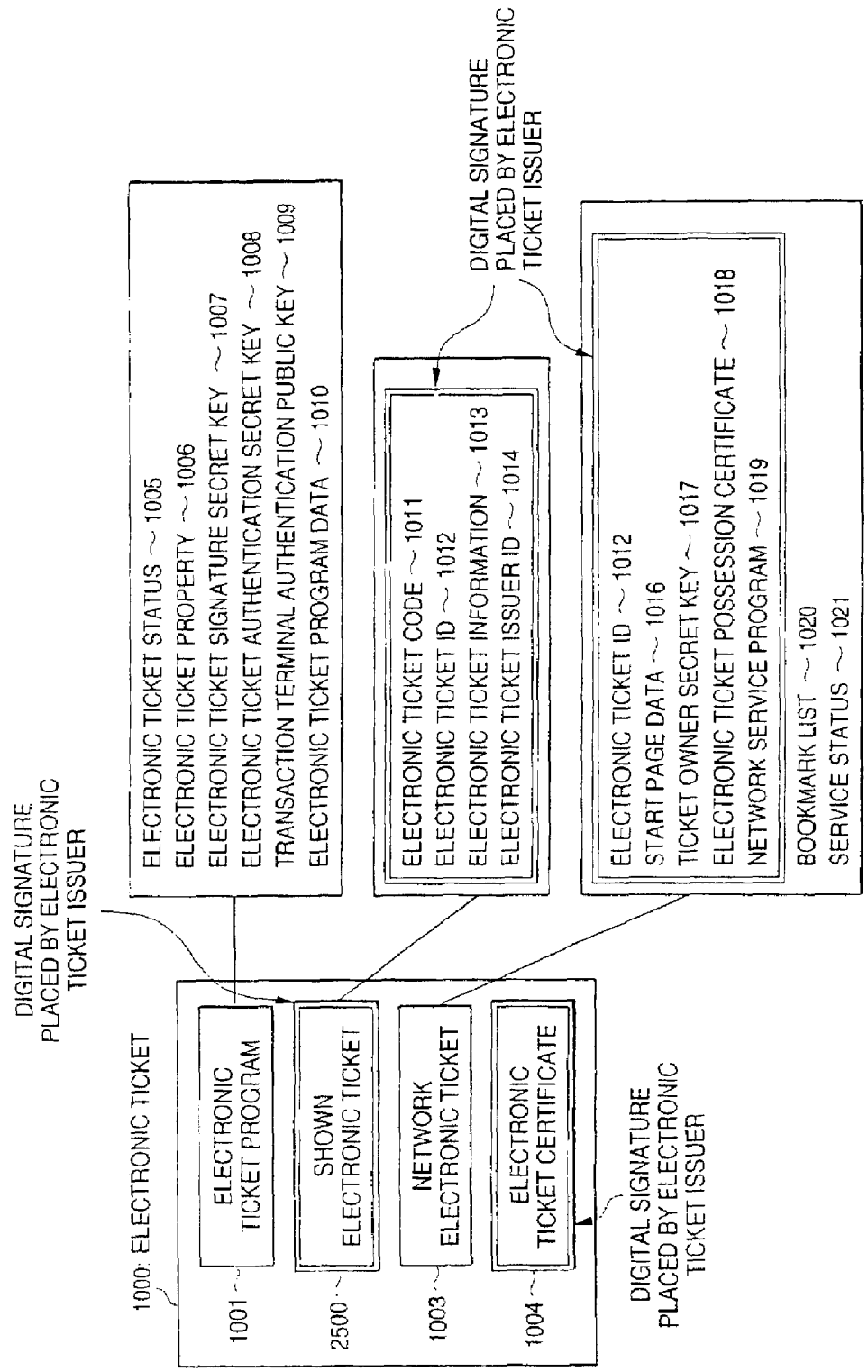
FIG. 25 is a data structure drawing of an electronic ticket in third and fourth embodiments of the invention.
Figure 26:
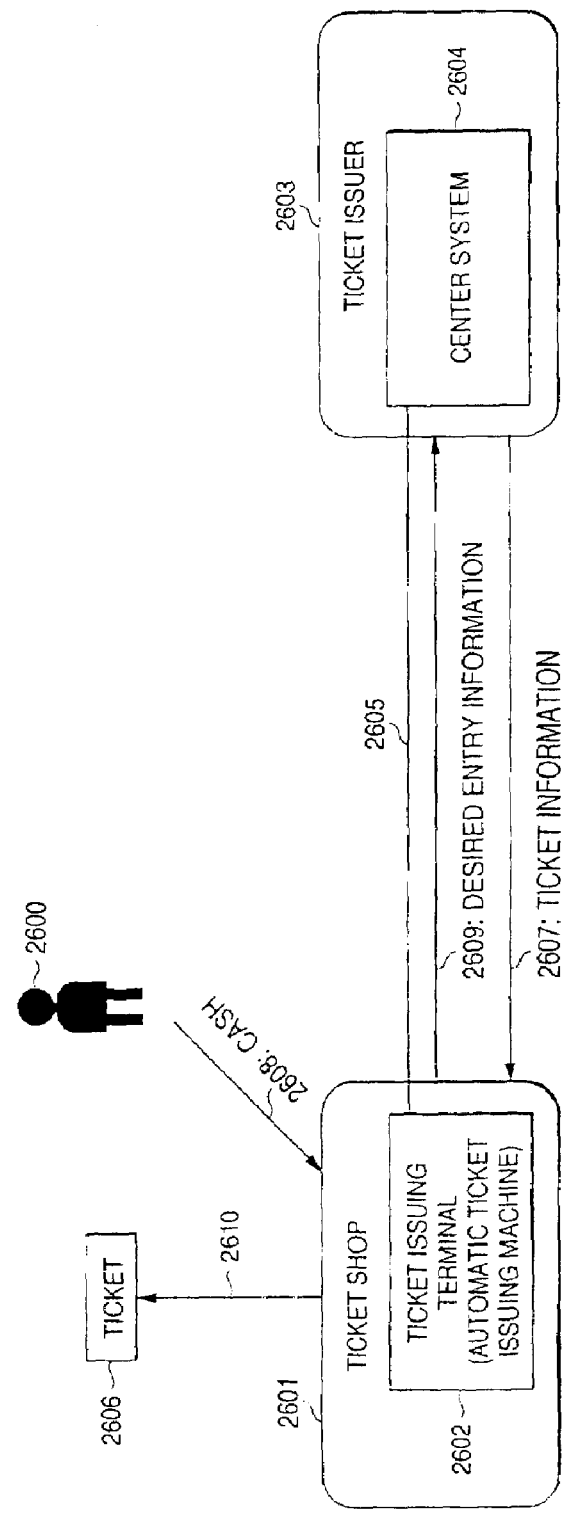
FIG. 26 is a block diagram to show the configuration of a system for selling reserved seat tickets (tickets) in a related art.
Figure 27:
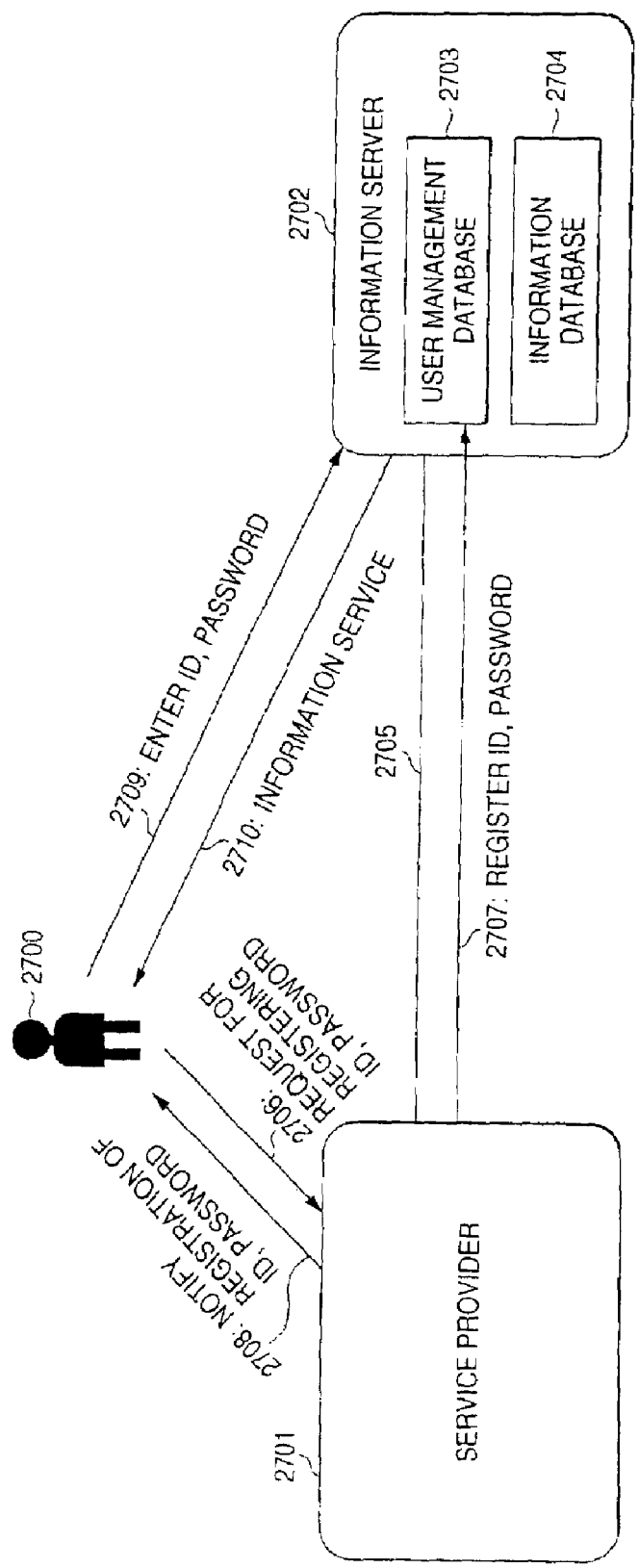
FIG. 27 is a block diagram to show the system configuration of membership network service in a related art.

First, FIG. 25 shows the data structure of a network-linked electronic ticket in the embodiment.

The data structure of a network-linked electronic ticket shown in FIG. 25 differs from that shown in FIG. 10 only in shown electronic ticket 2500. This difference will be discussed.

The data structure in FIG. 25 is the same as that in FIG. 10 except that a digital signature is placed on the entire shown electronic ticket 2500 by the electronic ticket issuer and except that the shown electronic ticket 2500 does not contain the entry of reserved information 1015.

Next, reserved seat acquisition service in the embodiment will be discussed.

Figure 23:
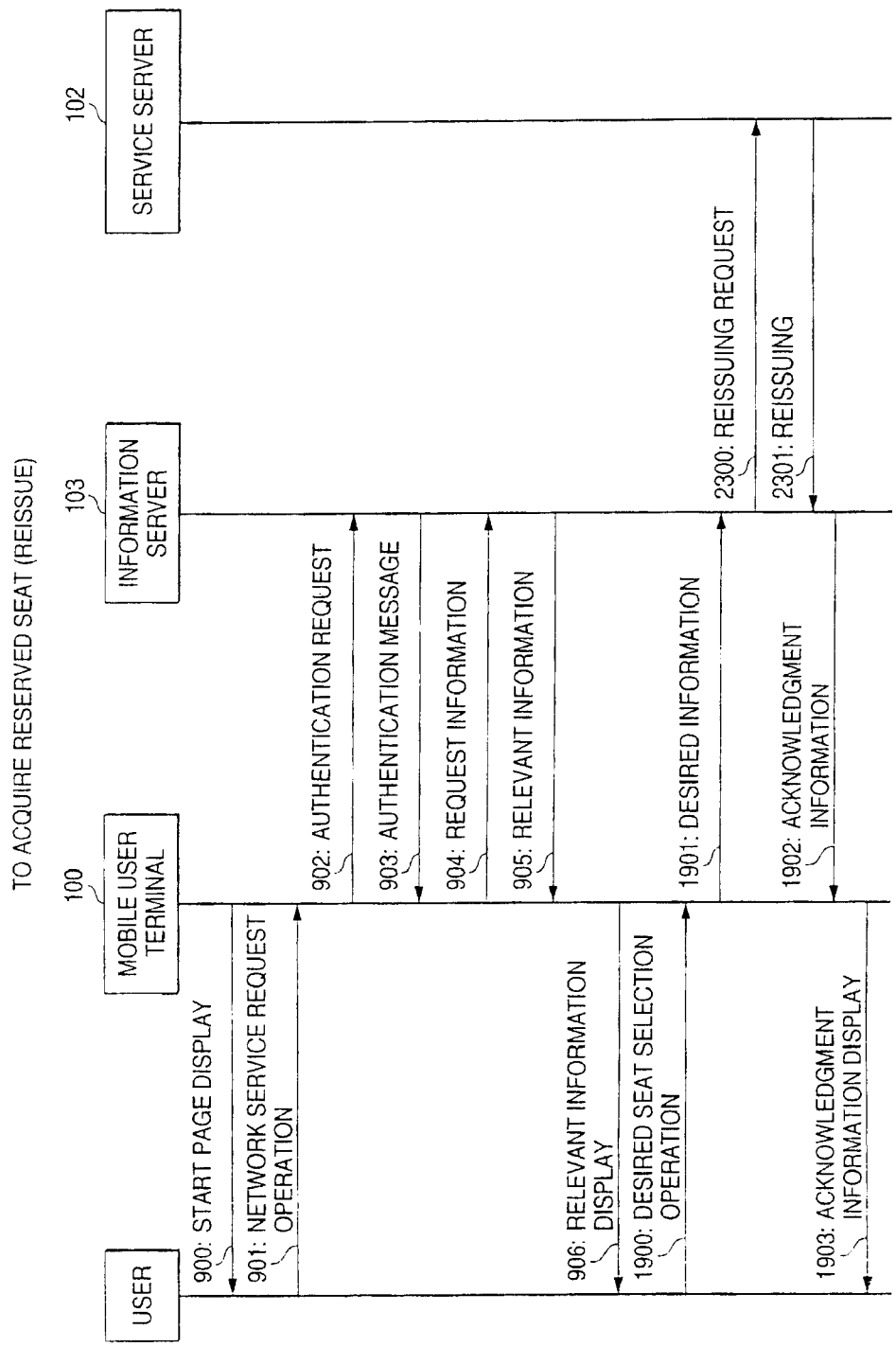
FIG. 23 is a chart of a procedure of acquiring a reserved seat in third and fourth embodiments of the invention.

FIG. 23 shows a reserved seat acquisition procedure. An information server 103 previously possesses a service server certificate and owns a service server public key.

In the procedure, the operation until an electronic wallet of a mobile user terminal 100 creates a desired information message 1901 and transmits the message to the information server 103 is the same as that previously described with reference to FIG. 19 in the second embodiment.

Upon reception of the desired information message 1901, first the information server 103 checks to see if the contents of the desired information message 1901 are valid. If the desired information message 1901 is valid, the information server 103 performs seat acquisition processing based on the contents of the desired information and transmits a message for requesting a service server 102 to reissue shown electronic ticket 2500, namely, a reissuing request message 2300 to the service server 102.

Upon reception of the reissuing request message 2300, first the service server 102 checks to see if the contents of the reissuing request message 2300 are valid. If the reissuing request message 2300 is valid, the service server 102 reissues a new shown electronic ticket 2500 based on the contents of the reissuing request message 2300, creates a reissuing message 2301, and returns the message to the information server 103.

Upon reception of the reissuing message 2301, first the information server 103 checks to see if the reissuing message 2301 is valid. If the reissuing message 2301 is valid, the information server 103 creates a message containing the new shown electronic ticket 2500 or an acknowledgement information message 1902 and returns the message to the mobile user terminal 100.

Upon reception of the acknowledgement information message 1902, first the electronic wallet of the mobile user terminal 100 checks to see if the acknowledgement information message 1902 is valid. If the acknowledgement information message 1902 is valid, the electronic wallet displays the updated vacant seat information based on the information in the acknowledgement information message 1902 for the user.

Next, the messages transferred between the electronic wallet of the mobile user terminal 100 and the information server 103 and between the information server 103 and the service server 102 in FIG. 23 will be discussed. An authentication request message 902, an authentication message 903, a request information message 904, and a relevant information message 905 have the same data structures as those shown in FIG. 11. The desired information message 1901 has the same data structure as that shown in FIG. 20.

Figure 22:
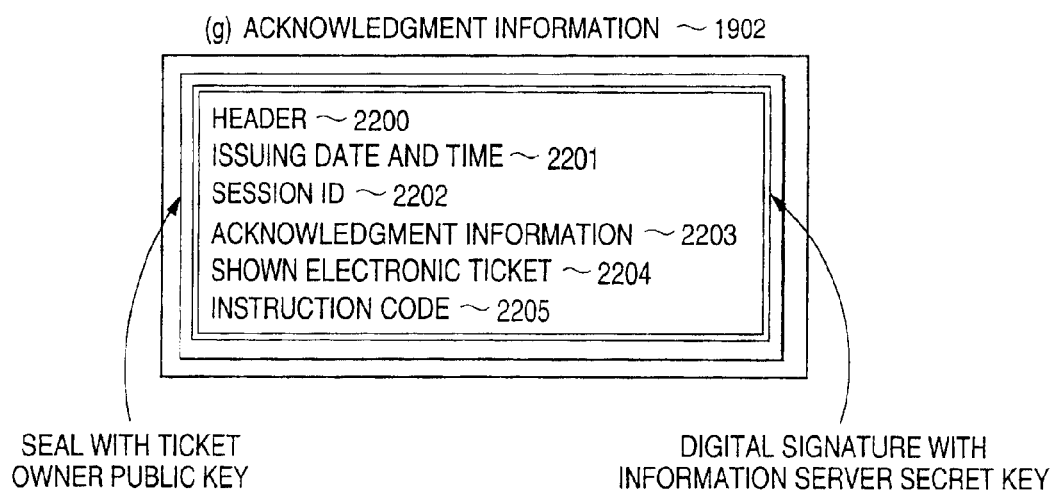
FIG. 22 is a data structure drawing of messages in third and fourth embodiments of the invention.

In the first embodiment, as shown in FIG. 20(f), the acknowledgement information message 1902 contains the update ticket information 2008 and the reservation information 1015 of the shown electronic ticket 1002 of the electronic ticket is added according to the update ticket information 2008. In the third embodiment, however, as shown in FIG. 22, the acknowledgement information message 1902 contains a new shown electronic ticket 2204 rather than update ticket information 1015 and upon completion of seat acquisition, the shown electronic ticket 2500 in the original electronic ticket is all rewritten.

Figure 24:
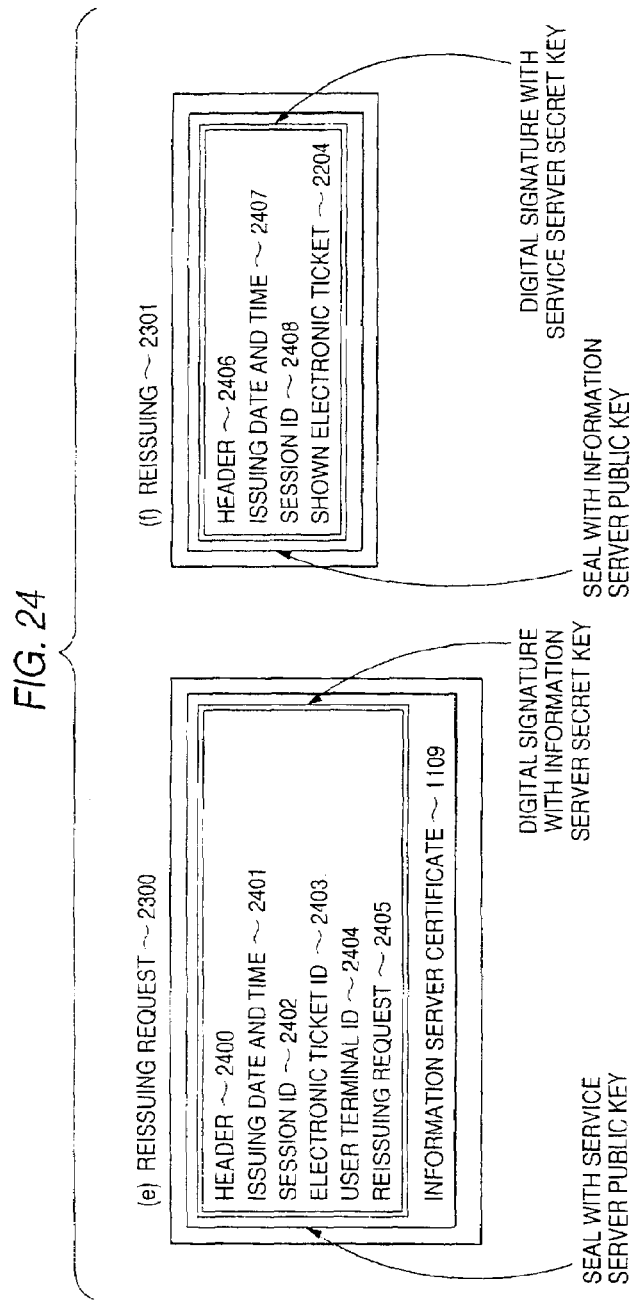
FIG. 24 is a data structure drawing of messages in third and fourth embodiments of the invention.

As shown in FIG. 24, the reissuing request message 2300 is made up of a header 2400 indicating that the message is a reissuing request message 2300, issuing date and time 2401 indicating the date and time at which the reissuing request message 2300 was issued, a session ID 2402, an electronic ticket ID 2403, a user terminal ID 2404, a reissuing request 2405 containing seat information after seat acquisition processing, and an information server certificate 2409. A digital signature is placed on the header 2400, the issuing date and time 2401, the session ID 2402, the electronic ticket ID 2403, the user terminal ID 2404, and the reissuing request 2405 with the information server secret key and further the entire message is sealed with the service server public key.

As shown in FIG. 24, the reissuing message 2301 is made up of a header 2406 indicating that the message is a reissuing message 2301, issuing date and time 2407 indicating the date and time at which the reissuing message 2301 was issued, a session ID 2408, and a new shown electronic ticket ID 2204 containing acquired seat information, issued from the service server 102. A digital signature is placed on the entire message with the service server secret key and further the entire message is sealed with the information server public key.

Next, processing in message exchange between the electronic wallet of the mobile user terminal 100 and the information server 103 and between the information server 103 and the service server 102 will be discussed in detail.

Processing of creation and transfer of the authentication request message 902, creation and transfer of the authentication message 903, creation and transfer of the request information message 904, creation and transfer of the relevant information message 905, creation and transmission of the desired information message 1901 is similar to processing in the second embodiment.

Upon reception of the desired information message 1901, first the information server 103 opens the sealed entire message with the information server secret key and checks the digital signature for validity with the ticket owner public key. Next, the information server 103 checks the header 2000, the issuing date and time 2001, and the session ID 2002 for validity. Next, the information server 103 uses electronic ticket possession certificate to check the electronic ticket ID 2003 and the user terminal ID 2004 for validity. If it is checked that all are valid, then the information server 103 performs seat acquisition processing for the specified vacant seat. Next, the information server 103 creates a reissuing request message 2300 and transmits the message to the service server 102.

Upon reception of the reissuing request message 2300, first the service server 102 opens the message with the service server secret key. Next, the service server 102 checks information server certificate 1109 for validity. Next, the service server 102 checks whether or not the digital signatures placed on the header 2400, the issuing date and time 2401, the session ID 2402, the electronic ticket ID 2403, the user terminal ID 2404, and the reissuing request 2405 are valid with the information server public key. Next, the service server 102 checks the header 2400 and the issuing date and time 2401 for validity. Next, the service server 102 checks the electronic ticket ID 2403 and the user terminal ID 2404 for validity. If it is checked that all are valid, then the service server 102 reissues a shown electronic ticket 2404 of the electronic ticket containing seat information based on the contents of the reissuing request 2405 and the electronic ticket ID 2403. Next, the service server 102 creates a reissuing message 2301 and returns the message to the information server 103.

Upon reception of the reissuing message 2301, the information server 103 opens the message with the information server secret key and checks the digital signature placed on the entire message for validity with the service server public key. Next, the information server 103 checks the header 2406, the issuing date and time 2407, and the session ID 2408 for validity. If it is checked that all are valid, then the information server 103 creates an acknowledgment information message 1902 using the new shown electronic ticket 2408 in the reissuing message 2401 and returns the message to the mobile user terminal 100.

In the electronic wallet of the mobile user terminal 100 receiving the acknowledgement information message 1902, the program module corresponding to the reserved seat acquisition service, called from the network service program 1019 opens the sealed message with the ticket owner secret key 1017 and checks the digital signature placed on the entire message for validity with the information server public key. Next, the header 2200, the issuing date and time 2201, and the session ID 2202 are checked for validity. Next, the acknowledgement information 2203 is checked for validity. If it is checked that all are valid, then the shown electronic ticket of the original electronic ticket 1000 is overwritten with the reissued shown electronic ticket 2204 and the electronic ticket is updated to that containing the seat information. Next, service status 1021 is changed to "inaccessible" to the reserved seat acquisition service based on the contents of an instruction code 2205. Next, new vacant seat information is displayed on the display section of the mobile user terminal 100 based on the new shown electronic ticket.

The processing in the embodiment has been described in detail. In this case, ticket information update means 3012 of the electronic wallet updates the service status 1021 and the electronic ticket based on the information received from the information server.

As described above, in the embodiment, the program module in the network service program 1019 of the network electronic ticket rewrites the entire shown electronic ticket 2500 in the network-linked electronic ticket 1000, whereby the reserved seat acquisition service can be provided.

The differences between the second and third embodiments will be discussed.

Since the second embodiment provides the method of rewriting the reservation information 1015 in the network service program 1019 of the network-linked electronic ticket 1000 in FIG. 10, a digital signature is not placed on the reservation information 1015 of the shown electronic ticket 1002 by the ticket issuer. In this case, the data amount of data communications conducted by the mobile user terminal 100 is small, thus if the mobile user terminal 100 has a low terminal capability, namely, the communication speed is low, etc., the method of the second embodiment may be used.

In contrast, as shown in FIG. 25, the third embodiment provides the method of rewriting all the shown electronic ticket 2500 of the network-linked electronic ticket 1000 on which the digital signature is placed by the ticket issuer. In this case, illegal tampering, etc., on the network in data communications can be prevented because of the digital signature and security is improved. Thus, if the importance of the changed ticket information is high, for example, when the seat type of reserved seat to be acquired is expensive and tampering, etc., must be prevented absolutely, the method of the third embodiment may be used.

Fourth Embodiment

In a fourth embodiment of the invention, to receive network information service, the program module called from the network service program 1019 of the network electronic ticket 1003 in the first, second, and third embodiments is down loaded from a service server 102. The system configuration is the same as that of the first, second, or third embodiment (FIG. 1).

An electronic wallet of a mobile user terminal 100 executes a program module down loaded from the service server 102 as in the first, second, and third embodiments for receiving network information service from an information server. At the termination of the network information service, the down-loaded program module is discarded (the down-loaded program module is erased from RAM 403). The data size of a network service program 1019 of a network electronic ticket 1003 can be lessened as much as the program module down loaded from the service server 102. Thus, the embodiment is useful to provide network information service not frequently used or network information service that can be used only once, for example, reserved seat acquisition service.

Applying the embodiment to reserved seat acquisition service will be discussed.

An information service name of "reserved seat acquisition," URL information of an information server for providing the information service, URL information of a reserved seat acquisition module, program module to be down loaded, and a service server ID of a service server 102 for providing the reserved seat acquisition module are embedded in display information concerning the reserved seat acquisition service in start page data 1016 of the network electronic ticket 1003. Further, a script for calling a down load module of a program module for down loading and executing a program module from the network is embedded.

If the user selects "RESERVED SEAT ACQUISITION" out of a network service menu (FIG. 13), the electronic wallet of the mobile user terminal 100 executes the script concerning the reserved seat acquisition service in the start page data 1016 and calls the down load module with the URL information of the information server and the URL information of the reserved seat acquisition module as parameters. The electronic wallet of the mobile user terminal 100 executes the down load module, connects to the service server 102 via a digital public network 104, down loads the reserved seat acquisition module from the service server 102, and executes the reserved seat acquisition module down loaded with the URL information of the information server as the parameter. The processing procedure of acquiring a reserved seat by the reserved seat acquisition module and the data structures of messages exchanged are the same as those in the second and third embodiments.

At the time, digital signature is placed on the down-loaded reserved seat acquisition module by the service server 102 places with a service server secret key. The service server 102 transmits a service server certificate together with the reserved seat acquisition module to the mobile user terminal 100. In the electronic wallet of the mobile user terminal 100 receiving the reserved seat acquisition module and the service server certificate, the down load module uses the service server certificate to check whether or not the digital signature placed on reserved seat acquisition module receiving program module is valid and next checks the service server ID for validity. The reserved seat acquisition module is executed only if it is checked that the digital signature and the service server ID are valid.

After the termination of the reserved seat acquisition service, the down-loaded reserved seat acquisition module is erased from the RAM 403 of the mobile user terminal 100.

The electronic wallet performing the processing comprises acquired program execution means 3013 for acquiring a program from the service server and prompting program execution means 3002 to execute the acquired program in addition to the components of the electronic wallet in the first embodiment (FIG. 30). Script execution means 3003 interprets a script contained in the start page data of the network electronic ticket and prompts the acquired program execution means 3013 to execute.

Additional information is provided for the terms used throughout the specification of the invention. First, the term "electronic wallet" generally used in the electronic commerce field is used as the means or apparatus for retaining an electronic ticket (generic name for tickets converted into electronic form) and a network electronic ticket (necessary information for connecting to a network from a network-linked electronic ticket and receiving information service). It refers to "means for managing/storing negotiable electronic information." Specifically, a mobile user terminal (portable terminal) or an "IC card" attached to the mobile user terminal serves the function. In addition, the electronic wallet may be provided by a "storage device," etc., in a PC. In this case, the program for executing the operation of the means in FIG. 30 or 31 is recorded on a record medium in a format readable by an electronic computer and the program on the record medium is read by a PC, whereby the electronic wallet in the PC can be provided.

For the information server for providing network information service for the electronic wallet and providing a program for acquiring network information service, the control program of the central processing unit of the information server is recorded on a record medium in a format readable by an electronic computer and the program on the record medium is read by another information server, whereby it can be converted into the information server forming a network-linked electronic ticket system.

For the concepts of the "electronic ticket" and the "network electronic ticket," the "electronic ticket" is a generic name for electronic information having a negotiable securities character that can be installed for use. It also includes "electronic money." On the other hand, the "network electronic ticket" is account for receiving information service and/or program information for performing data processing to receive information service. Both are entirely different from each other. Although the conceptual differences therebetween are described, the electronic ticket and the network electronic ticket may share data as actual installation of the network-linked electronic ticket.

As described above, according to the invention, first an electronic ticket for receiving necessary permission or service from a provider and a network electronic ticket for accessing an information providing apparatus via a network are provided in a network-linked electronic ticket.

Thus, it is made possible for the personal consumer to directly access the information server for providing relevant information from the network-linked electronic ticket and receive online information service; the convenience of the personal consumer is improved.

Second, the network electronic ticket in the network-linked electronic ticket contains display format information of a list of identification information of online information services that can be received.

Thus, the personal consumer can easily know the online information services that can be received and it is made possible for the personal consumer to easily receive desired network information service by selecting its identification information without previously knowing the location of the information providing apparatus on the network; the convenience of the personal consumer is improved.

Third, the network electronic ticket in the network-linked electronic ticket contains a certificate describing the identification information of the network-linked electronic ticket and the network-linked electronic ticket storage terminal.

Thus, the personal consumer need not register his or her ID or password for the provider and need not enter the ID or password each time and safety is enhanced and the convenience of the personal consumer is also improved. The service provider need not provide a database for managing the information of the registered membership IDs, passwords, etc., and the costs of the entire system can be reduced.

Fourthly, the network electronic ticket in the network-linked electronic ticket is provided with control information of the terminal storing the network-linked electronic ticket in an executable format by the terminal storing the network-linked electronic ticket.

Thus, it is made possible to communicate from the network-linked electronic ticket to an information providing apparatus and a ticket issuing apparatus on the network using the resources of the network-linked electronic ticket storage terminal and the communications do not depend on the type or performance of network-linked electronic ticket storage terminal, so that the convenience of the personal consumer is improved.

Fifthly, one piece of the control information is control information for rewriting the information in the electronic ticket and the information in the network electronic ticket.

Thus, it is made possible to acquire a reserved seat, etc., with safety through the online information service, and the convenience of the personal consumer is improved.

Sixthly, one piece of the control information is control information for generating information exchanged with the information providing apparatus.

Thus, when a message exchanged with the information providing apparatus is generated, the network-linked electronic ticket storage terminal cannot view the inside of the ticket, and safety is increased.

Seventhly, one piece of the control information is control information to prompt acquiring control information for rewriting the information in the electronic ticket and the information in the network electronic ticket from information providing means on the network and executing the acquired control information.

Thus, it is made possible to acquire from the network the control information used with the online information service accessed only once per network-linked electronic ticket, such as reserved seat acquisition service, and the data amount of the network-linked electronic ticket is lessened.

Eighthly, the display format information contains information for prompting execution of the control information.

Thus, the personal consumer selects any desired online information service out of the display format information, whereby the control information to receive the online information service is called, so that the operability of the personal consumer is enhanced and the convenience is also improved.

Ninthly, the electronic wallet is provided with electronic ticket storage means, information service reception means, and information display means.

Thus, it is made possible for the personal consumer to receive online information service by purchasing an electronic ticket, storing it in the electronic wallet, and possessing the electronic wallet; the convenience of the personal consumer is improved.

Tenthly, the electronic wallet is provided with information retention means for storing the information provided by the online information service and identification registration means for registering the identification information of the information stored in the information retention means in the network electronic ticket used at the time of receiving the online information service.

Thus, the personal consumer can retain the information of the online information service once provided in the electronic wallet and can directly access the retained information from the electronic wallet storing the network-linked electronic ticket; the operability of the personal consumer is enhanced and the convenience is also improved.

Eleventhly, the electronic wallet is provided with control information execution means for executing the control information in the network electronic ticket.

Thus, it is made possible for the personal consumer to access the online information service using the control information in the network electronic ticket from the electronic wallet; the convenience of the personal consumer is improved. Twelfthly, the electronic wallet is provided with means for rewriting the information in the electronic ticket and the information in the network electronic ticket based on the control information contained in the network electronic ticket.

Thus, it is made possible for the personal consumer to access the online information service using the network electronic ticket from the electronic wallet and receive addition or update of the information in the electronic ticket and the information in the network electronic ticket, whereby the personal consumer can receive provided service of reserved seat acquisition, etc.; the convenience of the personal consumer is improved.

Thirteenthly, the electronic wallet is provided with means for generating information exchanged with the information providing apparatus via the network based on the control information contained in the network electronic ticket.

Thus, it is made possible for the electronic wallet to generate a message exchanged with the information providing apparatus; the operability of the personal consumer is enhanced and the convenience is also improved.

Fourteenthly, the electronic wallet is provided with means for prompting the electronic wallet to acquire control information from the information providing means on the network based on the control information contained in the network electronic ticket and execute the acquired control information.

Thus, from the electronic wallet storing the network electronic ticket, it is made possible to acquire from the network the control information used with the online information service accessed only once per network-linked electronic ticket, such as reserved seat acquisition service; the operability of the personal consumer is enhanced and the convenience is also improved.

Fifteenthly, the electronic wallet is provided with means for checking whether or not the electronic signature placed by the information providing means on the acquired control information when the control information is acquired from the information providing means on the network is valid.

Thus, it is made possible for the electronic wallet to check the control information acquired from the information providing means for validity; safety is enhanced.

Sixteenthly, the electronic wallet is provided with means for interpreting information for prompting execution of the control information contained in the display format information of the network electronic ticket and prompting the electronic wallet to execute the control information.

Thus, it is made possible to call the control information in the network electronic ticket from the electronic wallet and access the online information service; the convenience of the personal consumer is improved.

Seventeenthly, the electronic wallet is provided with means for determining whether or not the information providing apparatus on the network is to be requested to provide online information service based on the information contained in the network electronic ticket indicating whether or not the online information service provided by the network electronic ticket can Thus, the personal consumer can know the online information services that can be accessed from the network-linked electronic ticket stored in the electronic wallet; the convenience of the personal consumer is improved.

What is claimed is:

1. A system utilizing an electronic ticket linked to an added value online information service for receiving necessary permission for providing a user access to an event, a commodity, and/or a service that requires a ticket for accessing from a provider managing a gate terminal, the electronic ticket for storing in a mobile terminal and for being linked to the added value online information service, said electronic ticket comprising a data retaining section for storing information including:

first authentication information including a first secret information for authentication processing of the electronic ticket with the gate terminal for allowing the user access to the event, commodity, and/or service after authenticating the electronic ticket;

identification information of an information server providing the online information service to an apparatus holding the electronic ticket; and second authentication information including a second secret information for authenticating a communication between the apparatus holding the electronic ticket and the information server for providing the user access to information about said event, commodity, and/or service after authenticating the communication.

2. The system according to claim 1, wherein the data retaining section stores additional information including menu information of the online information service which can be received by the apparatus for retaining the network-linked electronic ticket.

3. The system according to claim 1, wherein the data retaining section stores additional information including bookmark information indicating information which is received by the online information service and is stored in the apparatus.

4. The system according to claim 1, wherein the data retaining section stores additional information including:

reservation information which can be changed by the online information service provided by the information server; and a network service program which is a control program for controlling an apparatus communicating with the information server to change the reservation information.

5. The electronic ticket of claim 1, wherein said electronic ticket further comprises a third secret key for applying a digital signature to the electronic ticket.

6. A system comprising a service server for issuing an electronic ticket linked to an added value online information service, said issuing to an apparatus for holding the network-linked electronic ticket via a network comprising:

communication means for communicating with the apparatus;

a ticket issuing database for generating the electronic ticket; and a service server secret key for applying a digital signature to the electronic ticket, wherein the ticket issuing database is adapted to generate an electronic ticket comprising information including:
- first authentication information including a first secret information for authentication processing of the electronic ticket with a gate terminal for allowing a user access to an event, a commodity, and/or a service after authenticating the electronic ticket;
- identification information of an information server for providing the online information service to the apparatus holding the electronic ticket; and
- second authentication information including a second secret information for authenticating a communication between the apparatus holding the electronic ticket and the information server for providing the user access to information about said event, commodity, and/or service after authenticating the communication.

7. The system according to claim 6, wherein the ticket issuing database is adapted to further generate menu information of the online information service which can be received by the apparatus holding the electronic ticket and to compare the menu information in the electronic ticket.

8. The system according to claim 6, wherein the ticket issuing database is adapted to generate a data field for storing bookmark information indicating information which is received through the online information service and is stored in the apparatus, and to comprise the data field in the electronic ticket.

9. The system according to claim 6, wherein the ticket issuing database is adapted to generate reservation information which can be changed by the online information service provided by the information server, and to comprise the reservation information in the electronic ticket, wherein the electronic ticket, linked to the added value online information service, further comprises a network service program which is a control program for the apparatus to change the reservation information communicating with the information server.

10. An apparatus for holding electronic tickets with at least one electronic ticket for receiving a necessary permission for providing a user access to an event, a commodity, and/or a service from a provider managing a gate terminal, said apparatus comprising:
- ticket storage means for holding the electronic ticket linked to an added value online information service; and
- information service reception means for receiving the online information service from an information server, wherein
- the apparatus is adapted to perform authentication processing with a gate terminal using first authentication information including a first secret information which is included in the electronic ticket, said authentication for allowing the user access to the event, commodity, and/or service after authenticating the electronic ticket; and wherein
- the apparatus is also adapted for accessing the information server using identification information of the information server contained in the electronic ticket; and still further wherein
- the apparatus is also adapted for performing authentication processing of a communication with the information server by using second authentication information including a second secret information which is included in the electronic ticket, said second authentication for providing the user access to information about said event, commodity, and/or service after authenticating the communication.

11. The apparatus according to claim 10, wherein the electronic ticket linked to the added value online information service further includes menu information of the online information service which can be received by the apparatus holding the electronic ticket; and wherein the information service reception means is adapted to receive the online information service which a user of the apparatus selects from the menu information.

12. The apparatus according to claim 10, wherein the electronic ticket linked to the added value online information service further includes bookmark information indicating information which is received through the online information service by the information service reception means and is stored in the ticket storage means; and wherein the apparatus is adapted to retrieve, from the ticket storage means, information related to a bookmark which a user of the apparatus selects from the bookmark information.

13. The apparatus according to claim 10, wherein the electronic ticket linked to the added value online information service further includes:
- reservation information which can be changed by the online information service provided by the information server; and
- a network service program which is a control program for the apparatus communicating with the information server to change the reservation information; and wherein
- the apparatus is further adapted to receive the online information service and to change the reservation information in accordance with the network service program.

14. The apparatus according to claim 10, wherein the electronic ticket linked to the added value online information service further includes:
- reservation information which can be changed by the online information service provided by the information server; and
- identification information of a program module which is a control program for the apparatus for changing the reservation information; and wherein
- the apparatus is adapted to receive a program module indicated by the identification information of the program module and for changing the reservation information by executing the program module.

15. A method for issuing an electronic ticket by a service server, the electronic ticket being linked to an information server of an added value online information service, said issuing to an apparatus, via a network, for holding the electronic ticket, the method comprising the steps of:
- generating the electronic ticket;
- applying a digital signature to the electronic ticket;
- generating first authentication information including a first secret information for authentication processing of the electronic ticket with a gate terminal for allowing a user access to an event, a commodity, and/or a service;
- generating identification information of the information server providing the online information service to the apparatus holding the electronic ticket;
- generating second authentication information including a second secret information for authenticating a communication between the apparatus, when holding the electronic ticket, and the information server for providing the user access to information about said event, product, and/or service after authenticating the communication;
- including the generated information in the electronic ticket; and
- providing the electronic ticket to the apparatus for holding the electronic ticket.

16. The method of claim 15, wherein said electronic ticket further comprises a third secret key for applying the digital signature to the electronic ticket.

* * * * *